(12) United States Patent
Schmatz et al.

(10) Patent No.: US 12,120,097 B2
(45) Date of Patent: Oct. 15, 2024

(54) AUTHENTICATING KEY-VALUE DATA PAIRS FOR PROTECTING NODE RELATED DATA

(71) Applicant: International Business Machines Corporation, Armonk, NY (US)

(72) Inventors: Martin Schmatz, Rueschlikon (CH); Navaneeth Rameshan, Zurich (CH); Patricia M. Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 17/889,782

(22) Filed: Aug. 17, 2022

(65) Prior Publication Data

US 2024/0064130 A1 Feb. 22, 2024

(51) Int. Cl.
*H04L 9/40* (2022.01)
*H04L 9/06* (2006.01)
*H04L 9/08* (2006.01)
*H04L 9/32* (2006.01)

(52) U.S. Cl.
CPC ........ *H04L 63/0435* (2013.01); *H04L 9/0631* (2013.01); *H04L 9/0822* (2013.01); *H04L 9/321* (2013.01)

(58) Field of Classification Search
CPC . H04L 63/0435; H04L 9/0631; H04L 9/0822; H04L 9/321
See application file for complete search history.

(56) References Cited

U.S. PATENT DOCUMENTS

| | | | |
|---|---|---|---|
| 10,841,080 B2 | 11/2020 | Resch et al. | |
| 10,963,593 B1* | 3/2021 | Campagna | H04L 9/0861 |
| 10,979,403 B1* | 4/2021 | Mutescu | H04L 9/0631 |
| 2021/0176050 A1 | 6/2021 | Lidzborski et al. | |

(Continued)

FOREIGN PATENT DOCUMENTS

| | | | |
|---|---|---|---|
| WO | 2015069460 A1 | 5/2015 | |
| WO | 2018236420 A1 | 12/2018 | |

OTHER PUBLICATIONS

Rosa, M., "Virtual HSM: Building a Hardware-backed Dependable Cryptographic Store," Dissertation, Faculdade de Ciências e Tecnologia, Universidade Nova de Lisboa, Sep. 2019, 92 pages.

(Continued)

*Primary Examiner* — Hee K Song
(74) *Attorney, Agent, or Firm* — Zilka-Kotab, P.C.

(57) ABSTRACT

A computer-implemented method according to one embodiment includes using a first symmetric key to encrypt a second symmetric key. The first symmetric key is securely loaded inside a hardware security module (HSM) by a key management service before the encryption of the second symmetric key, and a cloud provider only has access to encrypted bits of the first symmetric key. Key data of a key-value-pair of the second symmetric key is used as additional authenticated data (AAD) for the encryption of the second symmetric key. The second symmetric key is used to encrypt value data of the key-value-pair. The method further includes storing the encrypted second symmetric key, the AAD used in the encryption of the second symmetric key, and tag bits created during the encryption of the second symmetric key, to thereafter use for verifying node related data.

20 Claims, 18 Drawing Sheets

(56) References Cited

U.S. PATENT DOCUMENTS

2023/0090972 A1* 3/2023 Rezaei ................. H04L 9/3226
 713/171
2024/0064130 A1* 2/2024 Schmatz ............... H04L 9/3271

OTHER PUBLICATIONS

Rath et al., "Security Pattern for Cloud SaaS: From System and Data Security to Privacy Case Study in AWS and Azure," Computers, vol. 8, 2019, pp. 11-28.
Happe, A., "Secure Cloud Identity Wallet D2.2 System Security Requirements, Risk and Threat Analysis," Credential, Mar. 31, 2016, 97 pages.
Crespo et al., "Research and Innovation Challenges in Data Protection, Security and Privacy in the Cloud: Map of synergies of the clustered projects—Version 2.0," Cluster of European Projects on Clouds: Data Protection, Security and Privacy in the Cloud, Jan. 15, 2016, 58 pages.
Mell et al., "The NIST Definition of Cloud Computing," Recommendations of the National Institute of Standards and Technology, Special Publication 800-145, Sep. 2011, pp. 1-7, retrieved from https://doi.org/10.6028/NIST.SP.800-145 (Accessed Mar. 2, 2022).
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," National Institute of Standards and Technology, Information Technology Laboratory, Version 15, Oct. 7, 2009, pp. 1-2.
CSRC, "Cloud Computing," Computer Security Resource Center, Oct. 2017, 3 pages, retrieved from https://csrcnist.gov/projects/cloud-computing.
Mell et al., "The NIST Definition of Cloud Computing," NIST Publications, Sep. 28, 2011, 2 pages, retrieved from https://www.nist.gov/publications/nist-definition-cloud-computing.
Prevail, "Public-private key pairs & how they work," Prevail, Blog, Jan. 12, 2021, 9 pages, retrieved from https://www.preveil.com/blog/public-and-private-key/.
Geeksforgeeks, "Difference between Private key and Public key," GeeksforGeeks, Jun. 2022, 5 pages, retrieved from https://www.geeksforgeeks.org/difference-between-private-key-and-public-key/.
International Search Report and Written Opinion from PCT Application No. PCT/IB2023/053315, dated Jul. 3, 2023.

* cited by examiner

AUTHENTICATING KEY-VALUE DATA PAIRS FOR PROTECTING NODE RELATED DATA

BACKGROUND

The present invention relates to data security, and more particularly, this invention relates to verification of data in storage systems and networks, including cloud-based storage systems and networks.

Cryptography is a science of secret writing with the goal of keeping the data secret. Public and private keys are fundamental concepts of public key cryptography, which is also sometimes referred to as asymmetric cryptography. In public key cryptography, every public key matches to only one private key. Together, they are used to encrypt and decrypt data. For example, a message that is encoded using a public key can only be decoded using a matching private key.

Data authenticity is mainly ensured by signing a document with a private key, such that any user of the data can verify the authenticity by using the corresponding public key.

BRIEF SUMMARY

A computer-implemented method according to one embodiment includes using a first symmetric key to encrypt a second symmetric key. The first symmetric key is securely loaded inside a hardware security module (HSM) by a key management service before the encryption of the second symmetric key, and a cloud provider only has access to encrypted bits of the first symmetric key. Key data of a key-value-pair of the second symmetric key is used as additional authenticated data (AAD) for the encryption of the second symmetric key. The second symmetric key is used to encrypt value data of the key-value-pair. The method further includes storing the encrypted second symmetric key, the AAD used in the encryption of the second symmetric key, and tag bits created during the encryption of the second symmetric key, to thereafter use for verifying node related data.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
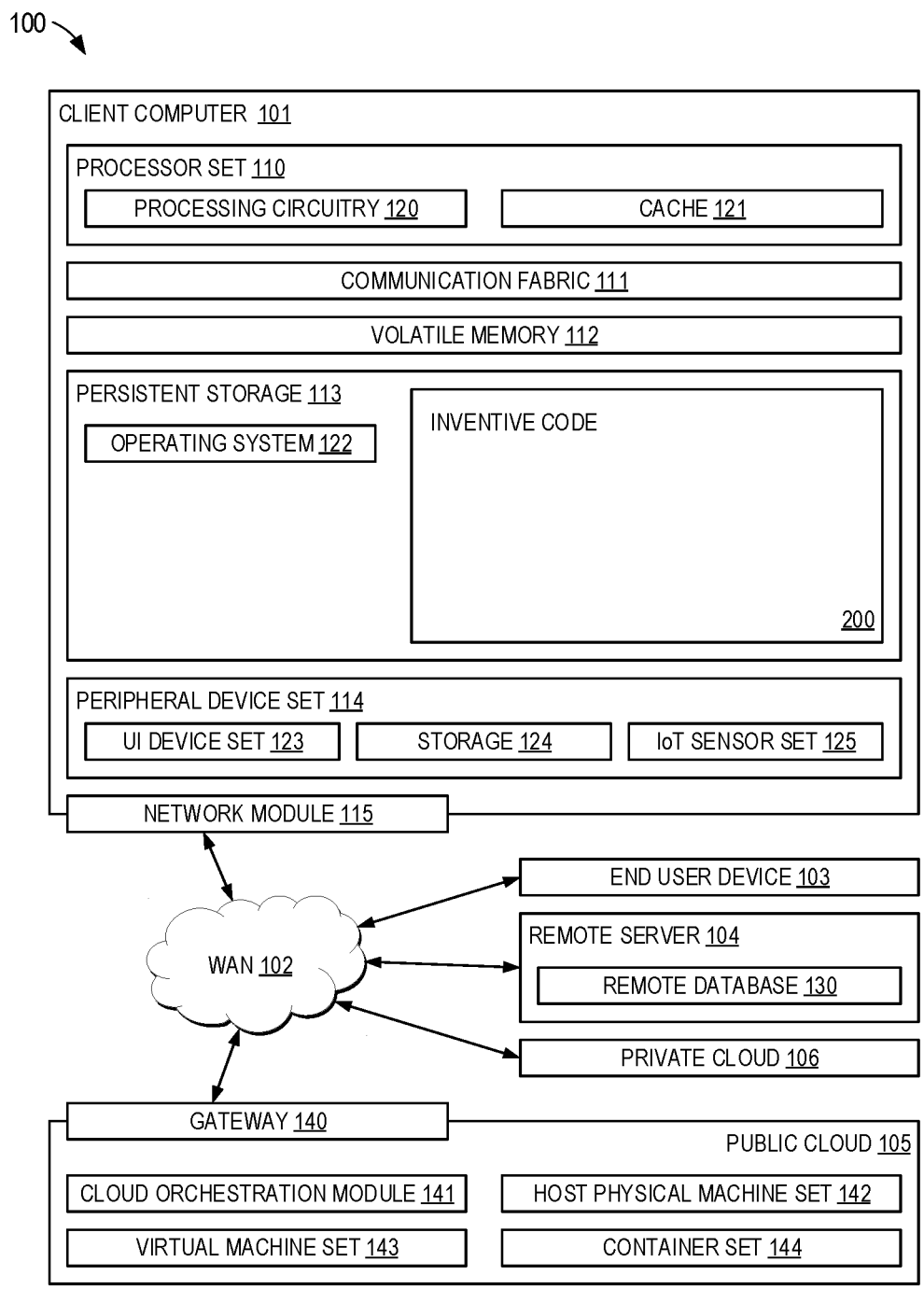
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of authenticating and securing key-value data pairs for protecting node related data that is thereafter verified using the key-value data pairs.

In one general embodiment, a computer-implemented method includes using a first symmetric key to encrypt a second symmetric key. The first symmetric key is securely loaded inside a hardware security module (HSM) by a key management service before the encryption of the second symmetric key, and a cloud provider only has access to encrypted bits of the first symmetric key. Key data of a key-value-pair of the second symmetric key is used as additional authenticated data (AAD) for the encryption of the second symmetric key. The second symmetric key is used to encrypt value data of the key-value-pair. The method further includes storing the encrypted second symmetric key, the AAD used in the encryption of the second symmetric key, and tag bits created during the encryption of the second symmetric key, to thereafter use for verifying node related data.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as inventive code in block 200 for authenticating and securing key-value data pairs for protecting node related data that is thereafter verified using the key-value data pairs. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere above, cryptography is a science of secret writing with the goal of keeping the data secret. Public and private keys are fundamental concepts of public key cryptography, which is also sometimes referred to as asymmetric cryptography. In public key cryptography, every public key matches to only one private key. Together, they are used to encrypt and decrypt data. For example, a message that is encoded using a public key can only be decoded using a matching private key.

Data authenticity is mostly ensured by signing a document with a private key, such that any user of the data can verify the authenticity by using the corresponding public key. However, signature algorithms are based on asymmetric cryptography which are slow when compared to symmetric cryptography. In addition, it is difficult to use a Hardware Security Module (HSM) for the purpose of signatures. This is because firmware of the HSM typically does not allow a private key to be extracted from the HSM, which severely limits the number of keys to be used due to memory limitations of the HSM.

In sharp contrast to the deficiencies described above, various embodiments and approaches described herein verify authenticity of data by both the client and a cloud provider with the root of trust firmly anchored inside an HSM. This is essentially a more flexible and relatively higher performance alternative to using signatures based on asymmetric keys by leveraging symmetric keys and executing all security relevant operations inside an HSM while maintaining full cloud-scale scalability.

Figure 2:
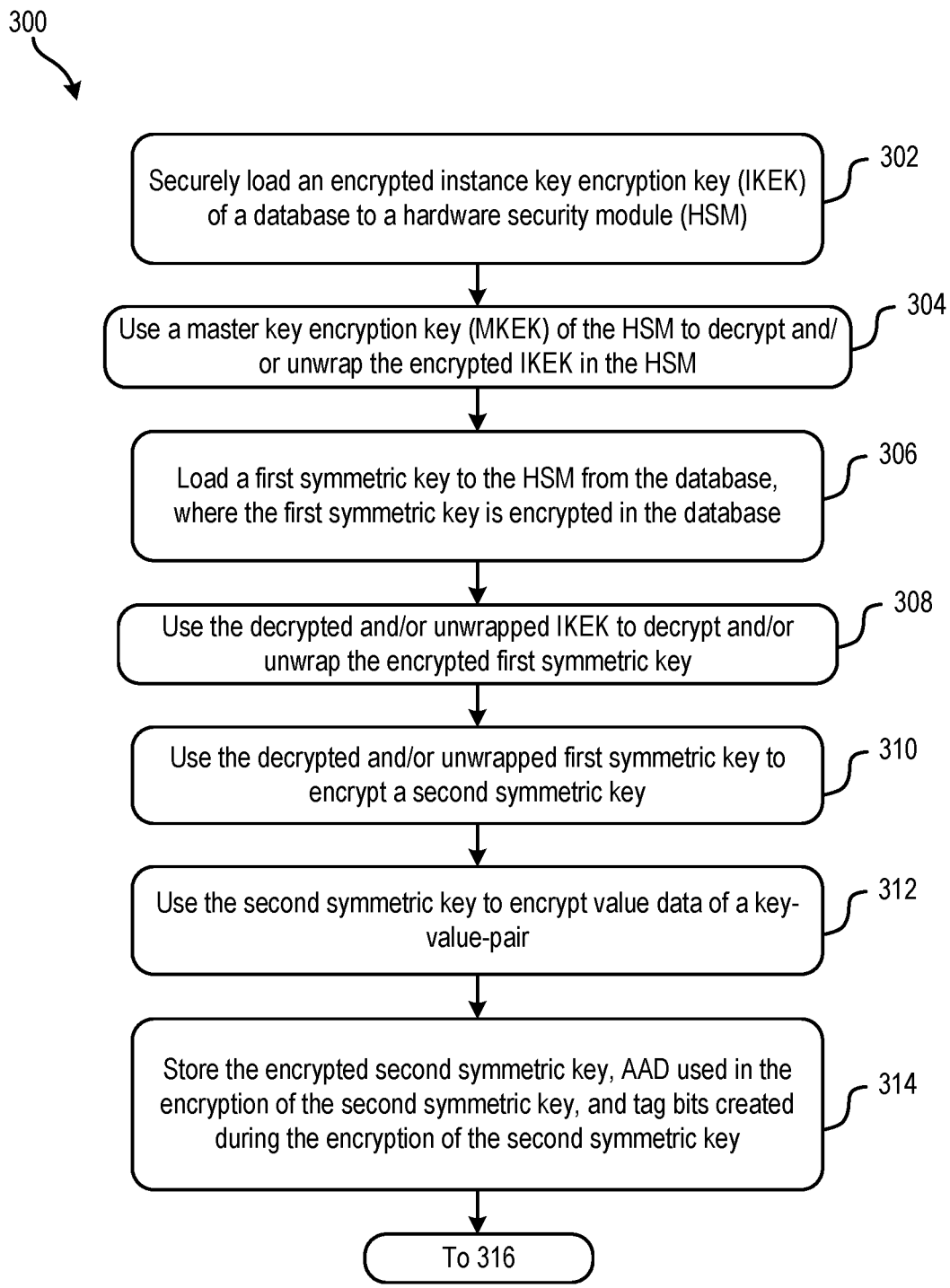
FIG. 2 is a flowchart of a method, in accordance with one embodiment.
Figure 2:
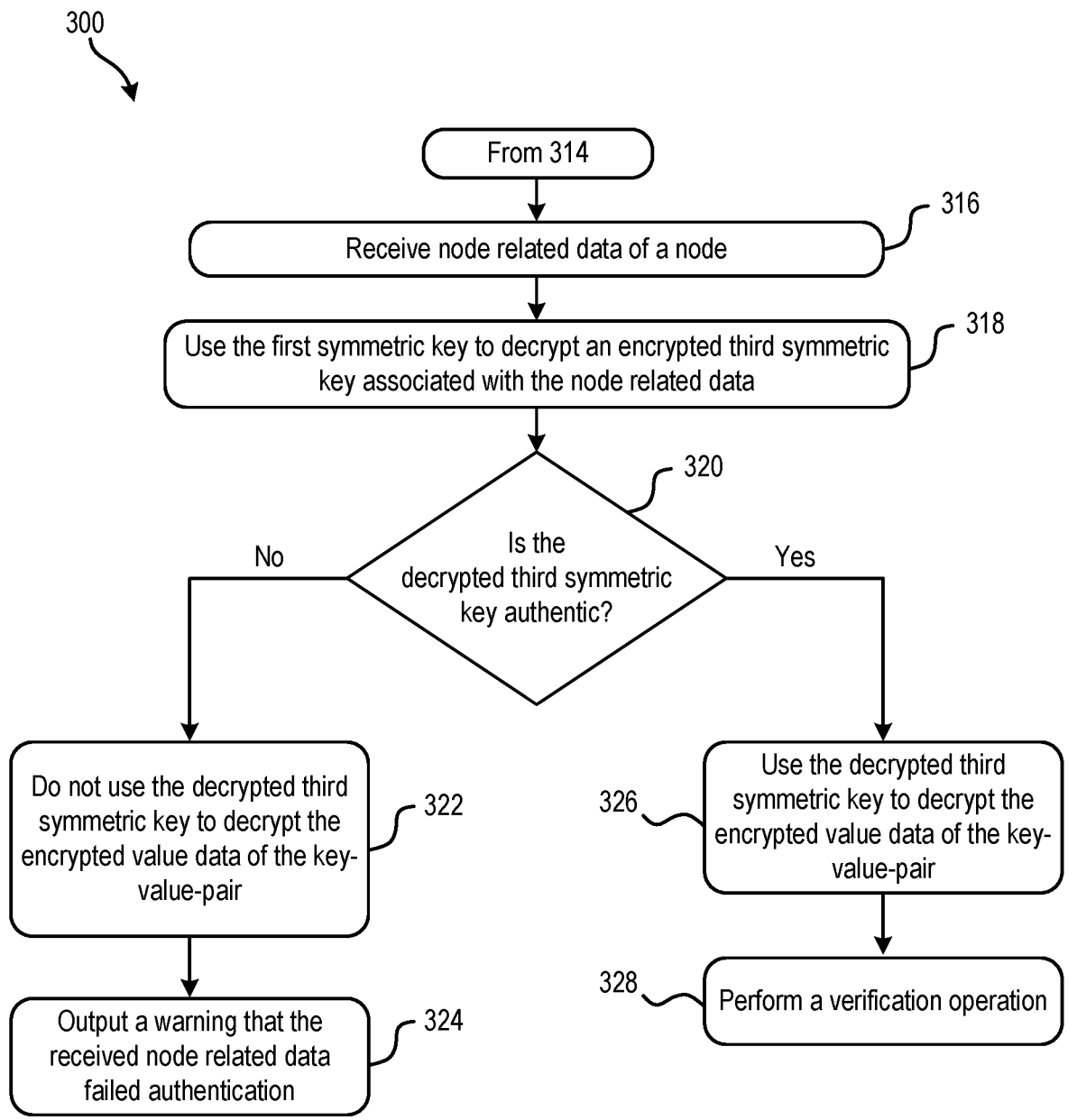

Now referring to FIG. 2, a flowchart of a method 300 is shown according to one embodiment. The method 300 may be performed in accordance with the present invention in any of the environments depicted in FIGS. 1-5F, among others, in various embodiments. Of course, more or fewer operations than those specifically described in FIG. 2 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that techniques of method 300 may be used to authenticate arbitrary data with a trust anchor inside an HSM with a preparation phase for node measurement. More specifically, various of these techniques may be used to authenticate and secure key-value data pairs for protecting node related data that is thereafter verified using the key-value data pairs. Keys of such authentication are not exposed, which is different than authentication using a public key which in sharp contrast posts the public key at a location. In some approaches, from a high level perspective, the authentication of method 300 may first include starting an environment, or where the authentication is performed as a service, method 300 may first include starting a verifier. Next clients, e.g., client devices, may be registered. For approaches in which multiple tenants/client use such a service, multiple clients are registered. Thereafter, compute nodes may be registered for each of the clients. Once this process is complete, an authenticity of information that is registered in these described steps may be verified.

The techniques described in greater detail in various operations of method 300 include descriptions of how a client device can check an authenticity of a public key of a Trusted Platform Module (TPM) (or any other data), in order to reduce the required trust level to a verifier. Rather than the verifier requesting a key management service (KMS), e.g., such as IBM's key protect (KP), to generate a fresh (random) client root key (CRK) for a client, a CRK may be directly imported to the HSM. Bits of the CRK may be defined by the client, however, these bits are preferably never seen in plain by the verifier. The client device may also have a KMS instance, and the client device may import the same CRK bits to the client device's own instance as provided to the verifier (as per above) for the KMS instance of the verifier. Both the verifier and the client device as a result have the bits of the CRK available inside the respective HSMs. The client device can ask the verifier to provide a wrapped symmetric key, e.g., wDEK, and corresponding tag bits, initialization vector (IV) and additional authenticated data (AAD) (or public key and IP address to recreate the AAD field) for a specific node. This way, a command may be issued to unwrap the wrapped symmetric key by the client device to the client device's KMS instance. If successful, the client device knows that an authentic public key for the specific node is being used. Various illustrative approaches that describe these techniques in further detail are described below, e.g., see operations 302-328 of method 300.

Operation 302 includes securely loading a first symmetric key inside a hardware security module (HSM). In one approach the first symmetric key is loaded from a known type of key management service database to inside the HSM by a known type of key management service. In some preferred approaches, the secure loading of the first symmetric key occurs before encryption of a second symmetric key, and may be triggered by predetermined verifier program code of a verifier initiating a command to load the first symmetric key inside the HSM. In some approaches, the first symmetric key is a client root key (CRK), e.g., such as an Advanced Encryption Standard (AES) key. Moreover, in some approaches, the second symmetric key may be a known type of data encryption key (DEK) that is configured to be encrypted, e.g., a wrapped DEK (wDEK), and be decrypted, e.g., an unwrapped DEK (plain DEK).

In some approaches, the first symmetric key resides in an encrypted state in the KMS database. Moreover, a cloud provider may in some approaches only have access to encrypted bits of the first symmetric key. Accordingly, in some approaches, in the process of being securely loaded inside the HSM, the first symmetric key may be decrypted. The process of securely loading the first symmetric key inside the HSM may in some approaches include loading an encrypted instance key encryption key (IKEK) of the KMS database to the HSM to assist in the process of unwrapping and/or decrypting the encrypted first symmetric key. Note that in other approaches, the IKEK may optionally reside in a wrapped or decrypted state in the KMS database. For approaches in which the encrypted IKEK is loaded in the HSM, a master key encryption key (MKEK) of the HSM may be used to unwrap and/or decrypt the encrypted IKEK in the HSM, e.g., see operation 304. Note that the decryption is essentially an unwrap command being executed in some approaches. The MKEK may be pre-loaded on the HSM and serves as a HSM master key. The verifier is "linked" to the HSM via the IKEK. In some approaches the IKEK is a key which the KMS automatically generates per instance, and is securely stored by the KMS in the KMS database. In some approaches the IKEK is wrapped by an MKEK, and the MKEK is securely preloaded to all HSMs of the KMS.

Once decrypted, the unwrapped and/or decrypted IKEK may be used to load the encrypted first symmetric key to the HSM from the database, e.g., see operation 306. More specifically, in some approaches, the unwrapped and/or decrypted IKEK is used to decrypt, e.g., unwrap, the encrypted first symmetric key, e.g., see operation 308, and therefore the IKEK may be loaded in the HSM to be used in the decryption process. Techniques that would become apparent to one of ordinary skill in the art upon reading the descriptions herein may be utilized for encrypting and decrypting the keys of the KMS database.

Operation 310 includes using the decrypted first symmetric key to encrypt the second symmetric key. In one preferred approach, the Advanced Encryption Standard with Galois/Counter Mode (AES-GCM) encryption is used to encrypt the second symmetric key. As will be described in greater detail elsewhere herein, the encryption of the second symmetric key is an "authenticatable" encryption because the second symmetric key is in some preferred approaches eventually used to ensure an authenticity of client nodes that register with a TEE that is in communication with the HSM. Accordingly using the decrypted first symmetric key to encrypt the second symmetric key enables authenticated encryption with associated data that is compared before and after the encryption, e.g., see FIG. 3. One or more types of key data, e.g., information of a node of a client that registers with the verifier, that is used to generate the unencrypted second symmetric key before the encryption of the second symmetric key, may be used during encryption of the second symmetric key by the first symmetric key. In one preferred approach, key data of a key-value-pair (or a hash of it) of the second symmetric key is used as additional authenticated data (AAD) for the encryption of the second symmetric key. In some approaches, all encryption and decryption described in various embodiments and/or approaches described herein, e.g., such as the encryption that is used for the second symmetric key, may be an Authenticated Encryption with Associated Data (AEAD) cipher. The key data may in some approaches include a hash, e.g., SHA256 hash, of node information, e.g., a public key, an IP address, etc. The key data may in some approaches additionally and/or alternatively include a hash, e.g., SHA256 hash, of a random number. The information may additionally and/or alternatively include an IV that is appropriately chosen using one or more predetermined known techniques, e.g., a random IV. Plain bits of the unencrypted second symmetric key are also available. Furthermore, because the AAD is present in the verifier, tag bits may be created with the encrypted second symmetric key, e.g., created during the AES_GCM encryption of the unencrypted second symmetric key. In some approaches, symmetric cryptography may be used for the encryption and/or decryption, e.g., one shared private key is used for the encryption and decryption.

Secret information, e.g., node related information, may be received from a node of a client device in some approaches. Note that this node is preferably the same node that the AAD is based on. For example, such secret information may include, e.g., a client key share, predetermined trusted platform module (TPM) (authorisation) secrets, a configuration of the node, a signature key, etc. This secret information may be stored as "value data" once encrypted and may be injected into the TPM. The unencrypted second symmetric key is in some approaches used to authenticatable encrypt value data of the key-value-pair, e.g., see operation 312. Once encrypted, the value data may be securely stored inside of a relevant client file in a known type of database. Furthermore, in some approaches, subsequent to the value data being encrypted by the unencrypted second symmetric key, the second symmetric key may be encrypted by the first symmetric key.

Operation 314 includes storing the encrypted second symmetric key, the AAD used in the encryption of the second symmetric key, and tag bits created during the encryption of the second symmetric key. In some approaches, the IV may additionally and/or alternatively be stored in operation 314. For context, one or more of these types of information that are stored in operation 314 are stored as information related to a specific node, e.g., the node that the AAD is based on. As will be described in greater detail below, this stored information is used for verifying node related data after being stored, e.g., see operations 316-328. The one or more types of information that are stored in operation 314 may in some approaches be stored in a database managed by the verifier. In some other approaches the information may additionally and/or alternatively be output to and stored on a client device. In yet another approach, the information may additionally and/or alternatively be stored at a plurality of storage devices at different locations.

It should be noted that although various operations are described above with respect to a single client device and node, in some approaches, method 300 includes registering several clients, where each of such clients may have one or several compute nodes. For each of these client compute nodes, some securely encrypted information may be stored using the techniques described above to register the node in order to thereafter enable the node to be verified, e.g., see operations 316-328.

Node related data of a node is received, e.g., see operation 316. The node related data may in some approaches be received by the verifier from a device of a client that is registered with the verifier. According to some approaches, the node related information may include, e.g., an IP address, public key information, a node ID, etc. The node related data may additionally and/or alternatively include tag bits of the node. Furthermore, the node related data may additionally and/or alternatively include an AAD of the node, which is in some approaches determined by hashing, e.g., SHA256 hashing, other information of the node related data, e.g., such as the IP address, public key information. In some approaches the node related data may be received with a request for accessing encrypt value data of the key-value-pair. In another approach the node related data may additionally and/or alternatively be received from an associated node with a request for being authenticated.

The first symmetric key is in some approaches used to decrypt an encrypted third symmetric key associated with the node related data, e.g., see operation 318. It should be noted that the encrypted third symmetric key may in fact be the encrypted second symmetric key, however, from a terminology perspective is called the "encrypted third symmetric key" here because an authenticity has not yet been satisfied, e.g., see operations 320-328.

An authenticity of the decrypted third symmetric key is determined, e.g., see decision 320. Looking to FIG. 3, exemplary sub-operations of determining an authenticity of a decrypted symmetric key are illustrated in accordance with one embodiment, one or more of which may be used to perform decision 320 of FIG. 2. However, it should be noted that the sub-operations of FIG. 3 are illustrated in accordance with one embodiment which is in no way intended to limit the invention.

Figure 3:
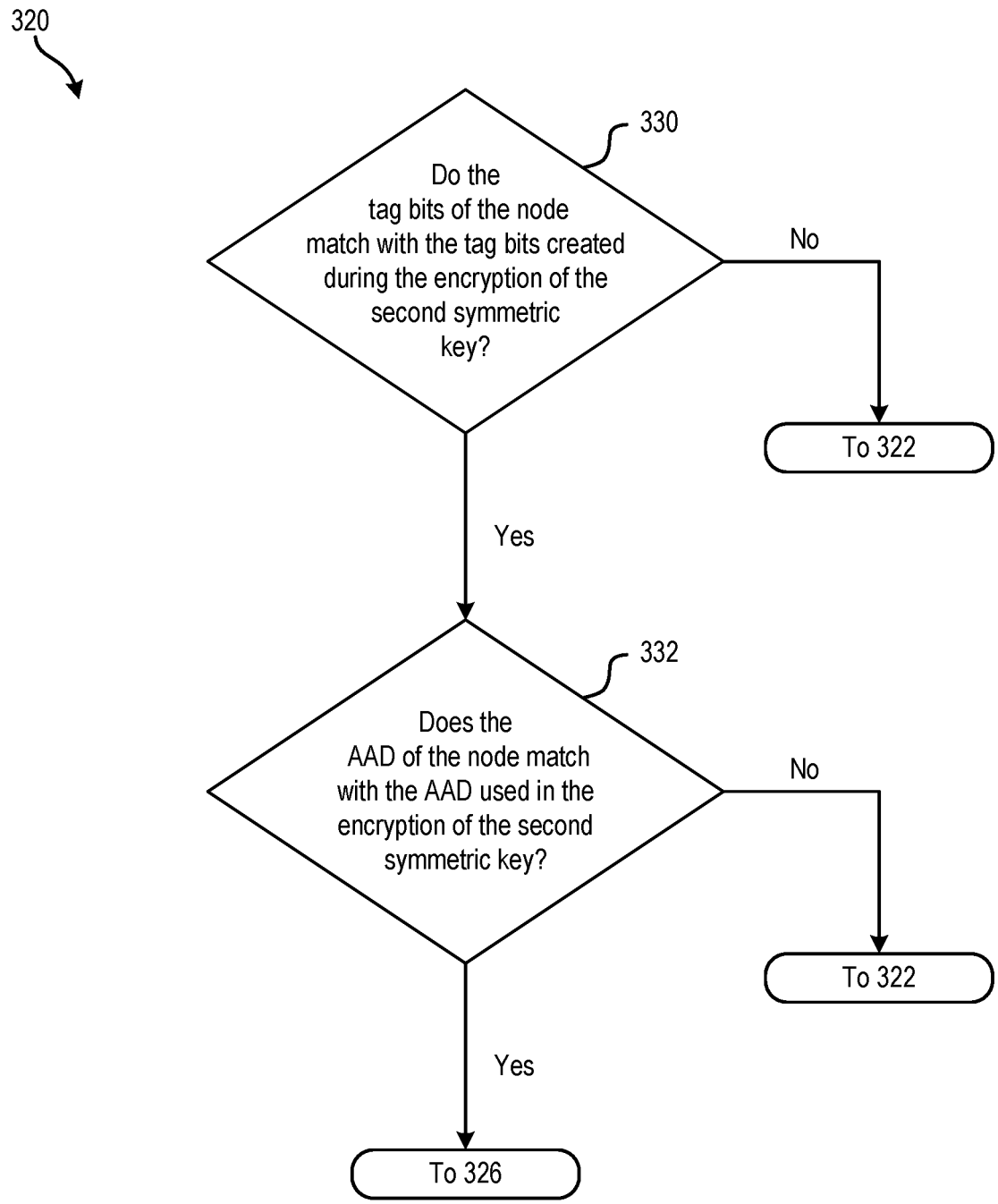
FIG. 3 is a flowchart of various sub-operations of an operation of the method of FIG. 2.

With continued reference to FIG. 3, in some approaches the authenticity of the decrypted third symmetric key is determined by one or more comparisons. In one of such approaches, the authenticity of the decrypted third symmetric key may be determined based on a first comparison of the tag bits of the node with the tag bits created during the encryption of the second symmetric key. For example, sub-operation 330 includes determining whether the tag bits of the node match with the tag bits created during the encryption of the second symmetric key. In some approaches, in response to a determination that the tag bits of the node match with the tag bits created during the encryption of the second symmetric key, e.g., as illustrated by the "Yes" logical path of sub-operation 330, a second comparison may optionally be performed to determine the authenticity of the decrypted third symmetric key. The second comparison may in some approaches be a comparison of the AAD of the node with the AAD used in the encryption of the second symmetric key. For example, sub-operation 332 includes determining whether the AAD of the node matches with the AAD used in the encryption of the second symmetric key. In response to a determination that the AAD of the node does not match with the AAD used in the encryption of the second symmetric key in the first comparison, e.g., as illustrated by the "No" logical path of sub-operation 332, and/or a determination that the tag bits of the node do not match with the tag bits created during the encryption of the second symmetric key in the second comparison, e.g., as illustrated by the "No" logical path of sub-operation 330, it may be determined that the decrypted third symmetric key is not authentic. More specifically, a determination that the decrypted third symmetric key is not authentic may include a determination that the decrypted third symmetric key is not the second symmetric key because the tag bits and/or AAD do not match. In response to a determination that the decrypted third symmetric key is not authentic, the method optionally continues the "No" logical path of decision 320, e.g., see FIG. 2. In some approaches, in response to the determination that the decrypted third symmetric key is not authentic, the decrypted third symmetric key is not used to decrypt the encrypted value data of the key-value-pair, e.g., see operation 322 of method 300. A warning that the received node related data failed authentication may additionally and/or alternatively be output, e.g., see operation 324. In one approach the warning is output to an administrator device of the verifier and indicates that a node is improperly attempting to access the encrypted data of the key-value-pair.

With reference again to FIG. 3, it may be determined that the decrypted third symmetric key is authentic, e.g., see the "Yes" logical path of decision 320, in response to a determination that the AAD of the node matches with the AAD used in the encryption of the second symmetric key in the first comparison, and/or a determination that the tag bits of the node match with the tag bits created during the encryption of the second symmetric key in the second comparison, e.g., as illustrated by the "No" logical paths of sub-operations 330 and 332 continue to operation 326. With reference now to FIG. 2, operation 326 includes using the decrypted third symmetric key, e.g., now authenticated to in fact be the second symmetric key, to decrypt the encrypted value data of the key-value-pair in response to the determination that the decrypted third symmetric key is authentic. The decryption of the encrypted value data of the key-value-pair may in some approaches include a process including loading previously stored encrypted data to the verifier, and decrypting the encrypted data using the decrypted third symmetric key, e.g., the plain DEK. With access to the node related data obtained as a result of the decryption of the encrypted data, one or more known types of verification operation(s) may be performed on the received node related data and/or the decrypted data, e.g., see operation 328.

It should be noted that in some approaches, the value data of the key-value-pair may be encrypted by a verifier having predefined verifier program code. Accordingly, in some approaches in which the verifier is configured to execute verifier program code, method 300 may optionally include executing a verifier to verify the node related data. In some approaches, this may be performed in a cloud computing environment inside a trusted execution environment (TEE), e.g., such as an attestable enclave. It should be noted that, the verifier can verify code, but cannot verify the TEE. Instead, techniques to check the integrity of a TEE is attestation, while the verifier is executed to verify node related data.

Authenticating and securing key-value data pairs for protecting node related data that is thereafter verified using the key-value data pairs has heretofore not been considered in conventional data authenticity techniques. As mentioned elsewhere above, this is because conventional signature algorithms are instead based on asymmetric cryptography which are relatively slow when compared to symmetric cryptography. In addition, it is difficult to use a conventional HSMs for the purpose of signatures. This is because firmware of the conventional HSMs typically does not allow a private key to be extracted from the HSM, which severely limits the number of keys to be used due to memory limitations of the HSM. Accordingly, there are numerous benefits enabled as a result of using various of the techniques described herein for protecting node related data. For example, the cryptography described herein is relatively faster as symmetric cryptography is used instead of asymmetric cryptography. This results in relative improvements to the efficiencies of computer systems that implement the techniques of various embodiments and approaches described herein. It should be noted that these enabled relative efficiencies do not come at the cost of decreased security in the techniques described herein. This is because key authenticity is ensured before encrypted node related data is encrypted in order to perform verification work. Accordingly, the inventive discoveries disclosed herein with regards to use of authenticating and securing key-value data pairs for protecting node related data that is thereafter verified using the key-value data pairs proceed contrary to conventional wisdom.

FIGS. 4A-4H depict a network 400, in accordance with one embodiment. As an option, the present network 400 may be implemented in conjunction with features from any other embodiment listed herein, such as those described with reference to the other FIGS. Of course, however, such network 400 and others presented herein may be used in various applications and/or in permutations which may or may not be specifically described in the illustrative embodiments listed herein. Further, the network 400 presented herein may be used in any desired environment.

Figure 4A:
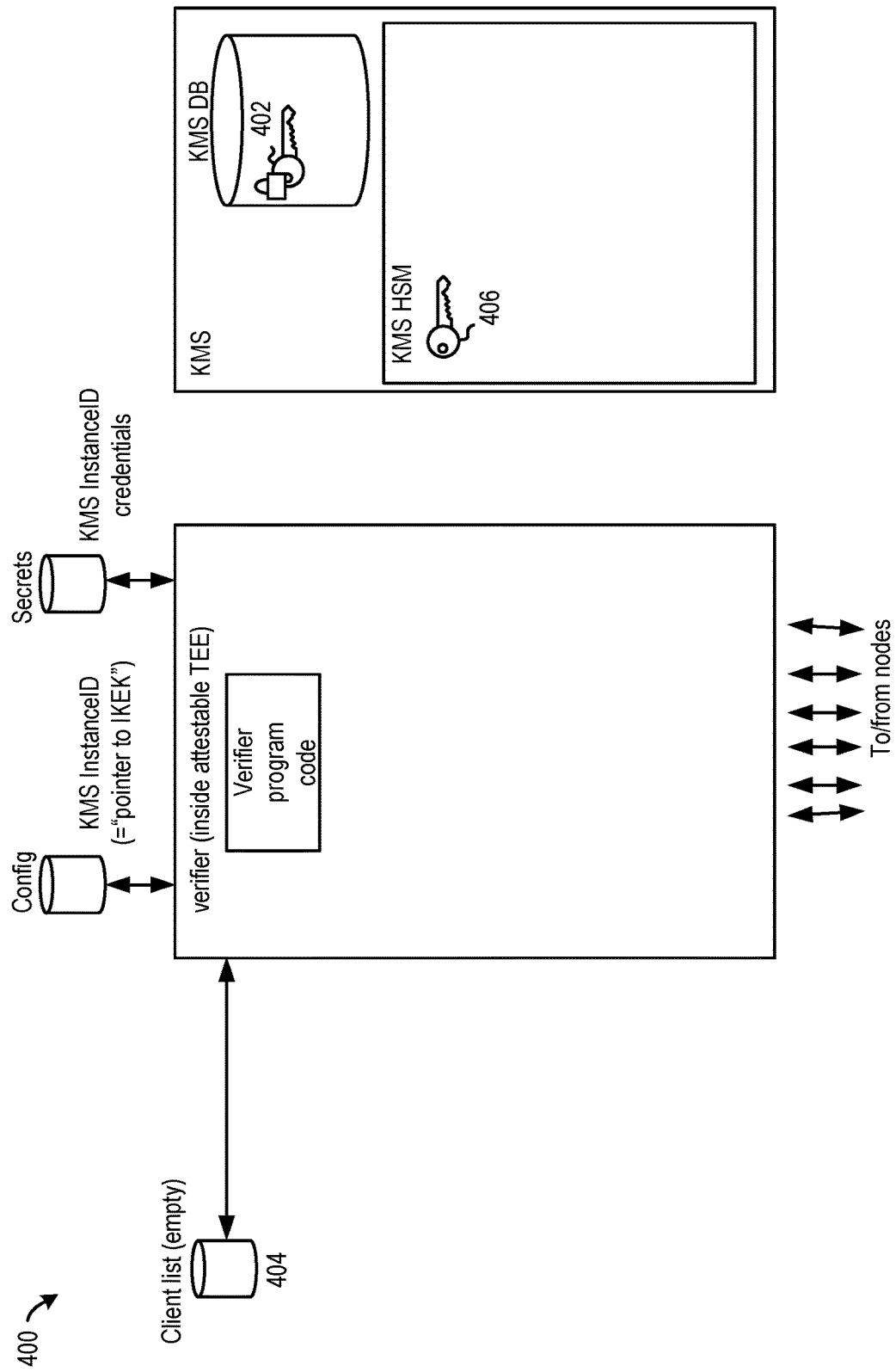
FIGS. 4A-4H depict the progression of a client node registration process, in accordance with one embodiment.

Referring first to FIG. 4A, the network 400 that includes a verifier may be started in one approach using a known startup process. Within the network 400, in one approach, it is preferable to run the verifier inside of an attestable trusted execution environment (TEE), e.g., such as a secure service container (SSC) on a mainframe. The verifier may include predetermined program code, e.g., see Verifier program code which may be used to access a KMS of the network 400. In one approach the KMS includes a KMS database, e.g., see KMS DB. According to some more specific approaches, the KMS may include a KMS service and/or another key management service (KMS), e.g., such as IBM's Key Protect (KP) which is one implementation of IBM's KMS, that handles one or more extra keys. In order to access the KMS of the network 400, the verifier may include configuration data, e.g., see config, and/or secrets. In one approach the configuration data may include an instance ID of that KMS instance, e.g., the KMS instance ID, which, in the wider sense may be a pointer to where an instance key encryption key (IKEK) 402 is being stored. In some approaches the secrets of the verifier my include tokens and/or credentials, e.g., such as KMS instance ID credentials, that enable access to the KMS.

In some approaches, the verifier maintains a client list that is database that is initially empty, e.g., see Client list (empty). Although in some approaches at the startup of the verifier the client list is empty, the client list may eventually be populated with information 404, e.g., client IDs, client related metadata 410 such as billing information, client related metadata such as email addresses, other known types of client related metadata, etc. The information 404 may additional and/or alternatively include a pointer to a client filename of a file that is maintained in a different database, e.g., some database other than a database that stores the information 404 of the client list.

At this point it may be assumed that the verifier is up and running, and no clients are yet registered in the client list. It may also be assumed that a KMS, e.g., see KMS HSM, is running and includes a master key encryption key (MKEK) 406 loaded. In one approach the MKEK 406 is a key that originates inside the KMS HSM and has otherwise not been seen outside of the KMS HSM. In another approach, the MKEK 406 may additionally and/or alternatively be pre-loaded on the KMS HSM and serve as a HSM master key. Additionally, because KMS is itself a multi-tenant configuration, the IKEK 402 is owned by the verifier, although the IKEK 402 is encrypted in the KMS database by means of the MKEK 406.

Lastly, the To/from nodes arrows point to IP addresses of compute nodes which a client aims to later perform a known type of measurement on in order verify nodes. However, at this stage the nodes are not yet connected because information used to perform such measurements is not available at startup of the verifier.

In one approach a prerequisite of the network may be that the verifier runs in an TEE, e.g., where a client device may perform an attestation of the TEE. The prerequisite may additionally and/or alternatively include the verifier owning a KMS instance. The prerequisite may additionally and/or alternatively include the verifier having a key value store with a key, e.g., clientID, value CRK_keyID (to be filled later), which may be stored with a client list, e.g., client_list.

Figure 4B:
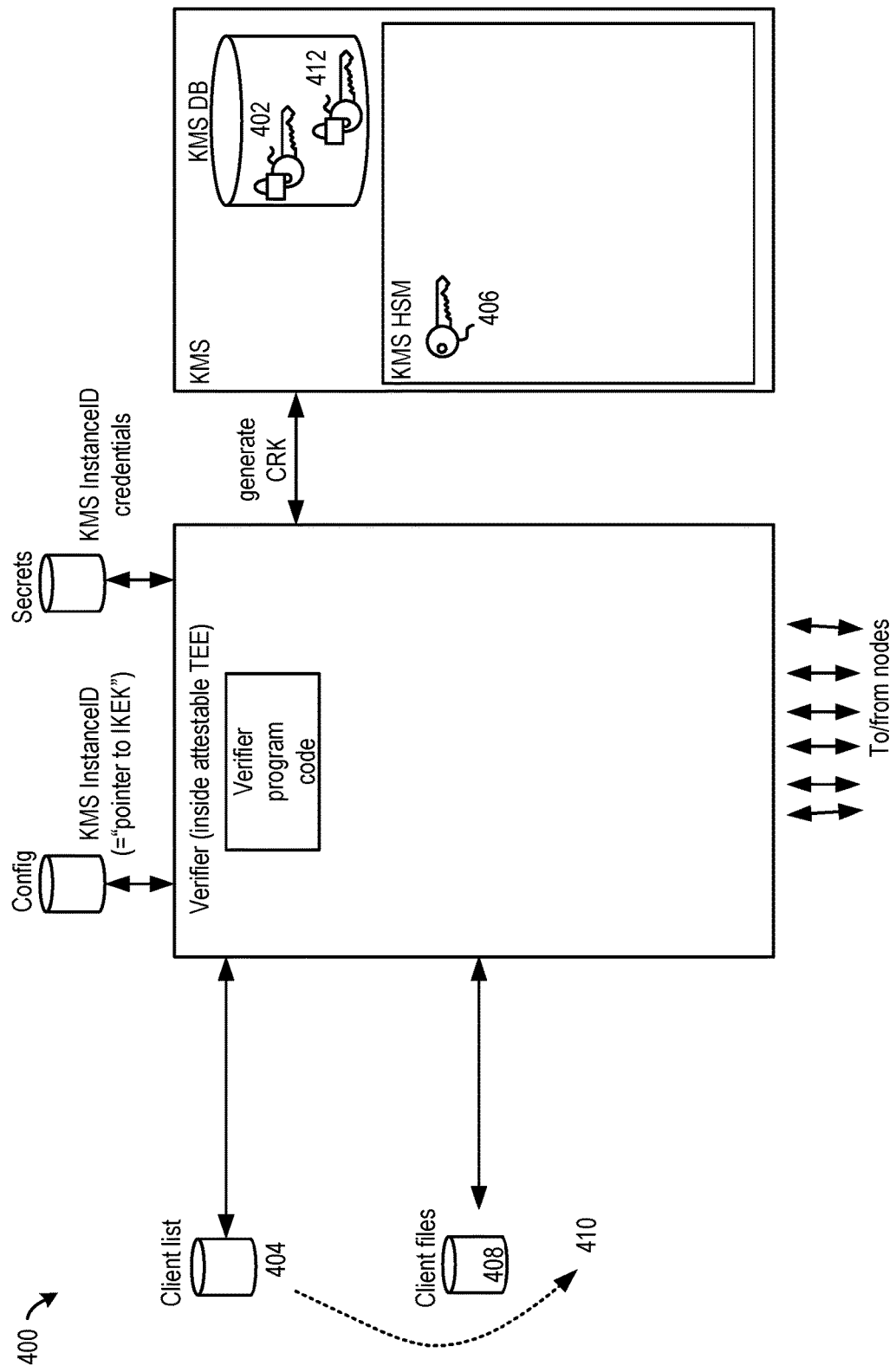

With reference now to FIG. 4B, a request may be received from a client device for registering with the verifier, e.g., in order to register with a verifier service associated with the verifier, e.g., see Client list. In some approaches, the request includes information associated with a client of requesting client device, e.g., a ClientID, client data, etc. The requesting client may be assigned a client file name 408, e.g., ClientID_1, where all the files are located for that specific client. As illustrated in FIG. 4B, in one approach the client file name 408 may be stored in a second database, e.g., Client files. In another approach, the client file name 408 may additionally and/or alternatively be stored in a first database, e.g., see Client list. According to various approaches, the client file may include information, e.g., ClientID, a number of nodes that the client has that the client would like to verify, a list of NodeIDs, etc.

The client may be assigned a client root key ID (CRK_keyID) of a client root key (CRK) 412 that is generated in the KMS DB, e.g., see generate CRK. More specifically, in one approach generating the client root key may include the verifier sending an instruction to the KMS to generate a CRK. In response to receiving the instruction to generate the CRK, the KMS generates the CRK 412 inside the KMS HSM. Generating the CRK 412 inside the KMS HSM in some approaches includes loading the IKEK 402 on the KMS HSM, which in one approach may include using the MKEK 406 to unwrap the IKEK 402. Thereafter the CRK 412 may be encrypted using the IKEK 402.

Figure 4C:
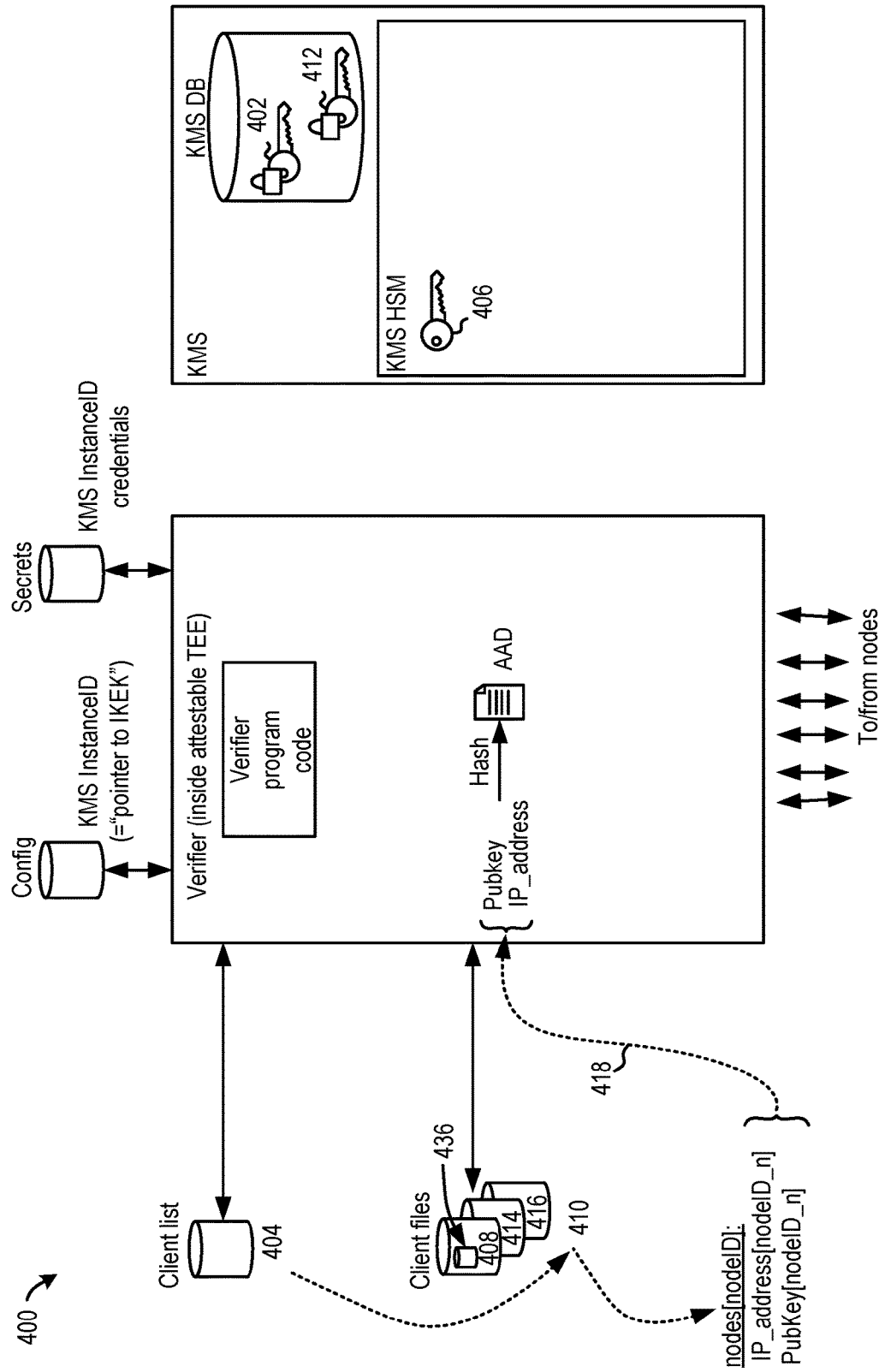

In FIG. 4C, a process in which client nodes are registered in the network 400 is illustrated according to one approach. Note that although in FIG. 4C operations are described for purposes of an example with respect to the first node of the client having ClientID_1, additional clients have been registered with the verifier, e.g., see second client 414 which may be assigned a client ID Client_2, and $N^{th}$ client 416 which may be assigned a client ID Client_N. It may also be noted that each client file of the client files may contain metadata and a node list 436, and each node list entry contains metadata and a secret/encrypted JSON 438. It may be assumed that the first node is characterized by information including an IP address of the first node, e.g., see IP_address[nodeID_n], and a public key, e.g., PubKey[nodeID_n], that is ultimately being used to verify any measurement data which is generated and signed inside the nodes, e.g., see To/from nodes. Such information is fed into the verifier, e.g., see operation 418, and the verifier creates a Hash, e.g., such as a SHA256, which is eventually used as an additional authenticated data (AAD) for symmetric encryption operations which will be described in greater detail elsewhere herein.

The process in which client nodes are registered with the verifier in the network 400 may additionally and/or alternatively include the verifier enabling the client to securely import a CRK, e.g., in the sense of bring your own key, into the KMS instance of the verifier, e.g., CRK_keyID and clientID. The verifier may add the clientID and/or CRK_keyID to the client_list, and the verifier may create a key-value store, e.g., on disk, for the clientID, e.g., see node_list[clientID].

Figure 4D:
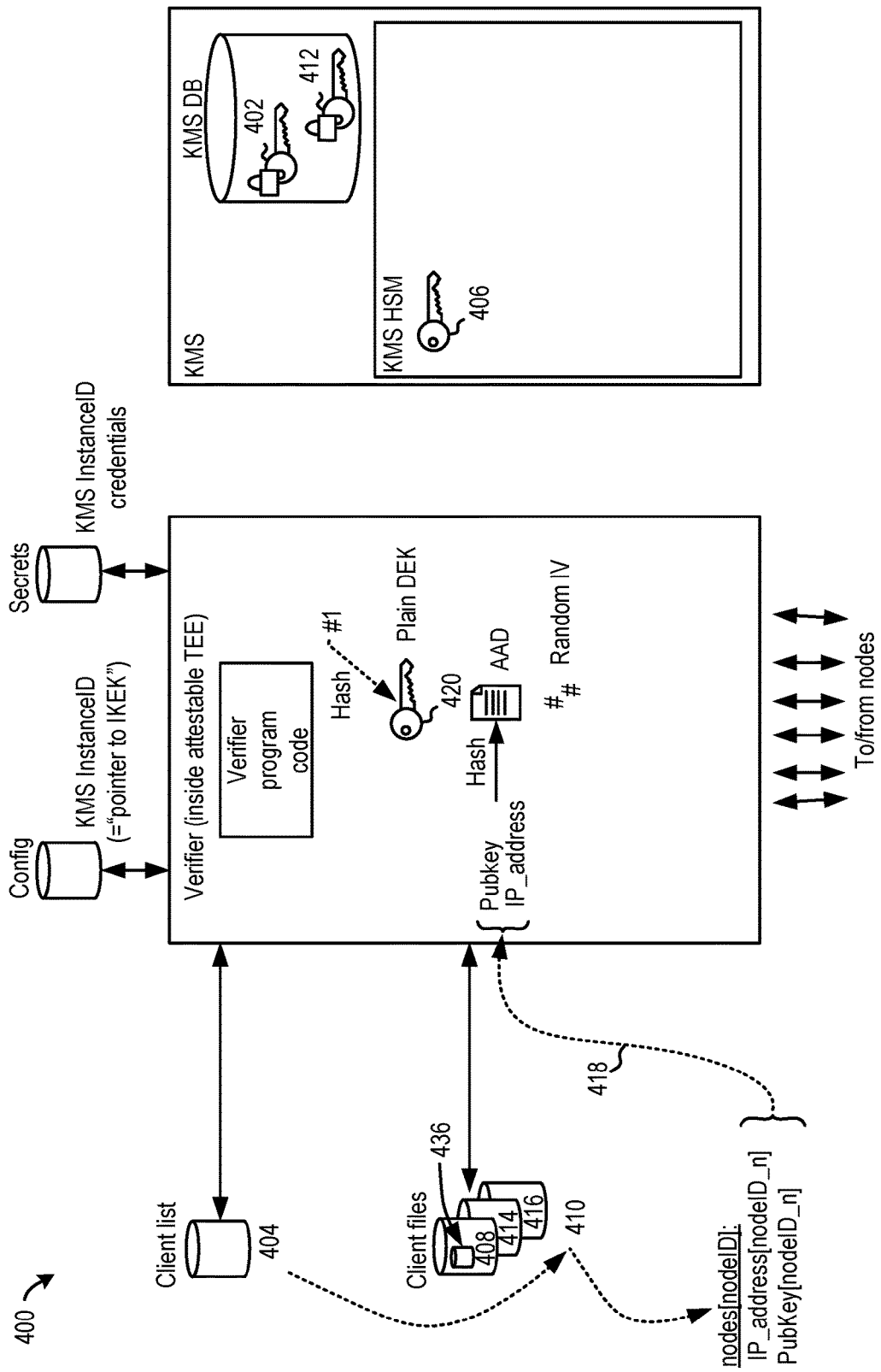

Referring now to FIG. 4D, the verifier generates a random number, e.g., see #1. In some approaches entropy is generated. For example, a plain data encryption key (DEK) 420 may be generated by means of a SHA256 hash. Accordingly, the plain DEK 420 may be a 256 bit symmetric data encryption key.

For some optional approaches that utilize Advanced Encryption Standard with Galois Counter Mode (AES-GCM) cryptography, a random initialization vector may be called for, e.g., see Random IV, which may be generated using a random number.

Figure 4E:
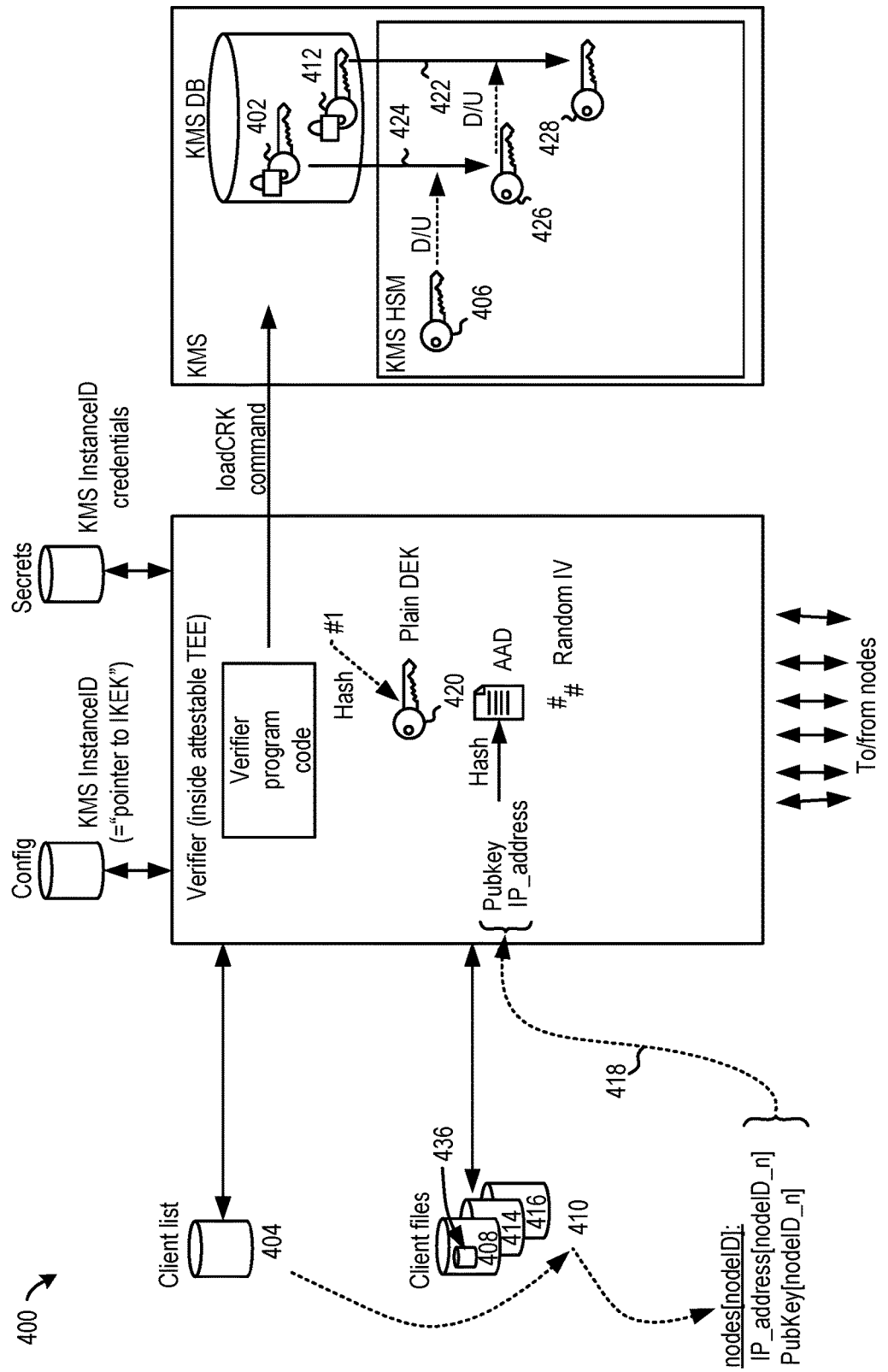

In FIG. 4E, the verifier issues a command for the KMS to load the CRK 412 to the KMS HSM. Accordingly, in operation 422 the CRK 412 is loaded to the KMS HSM. The IKEK is also loaded, e.g., see operation 424, and decrypted and/or unwrapped by the MKEK 406, e.g., see D/U. The decrypted IKEK 426 is used to decrypt and/or unwrap the CRK, e.g., see decrypted CRK 428.

Figure 4F:
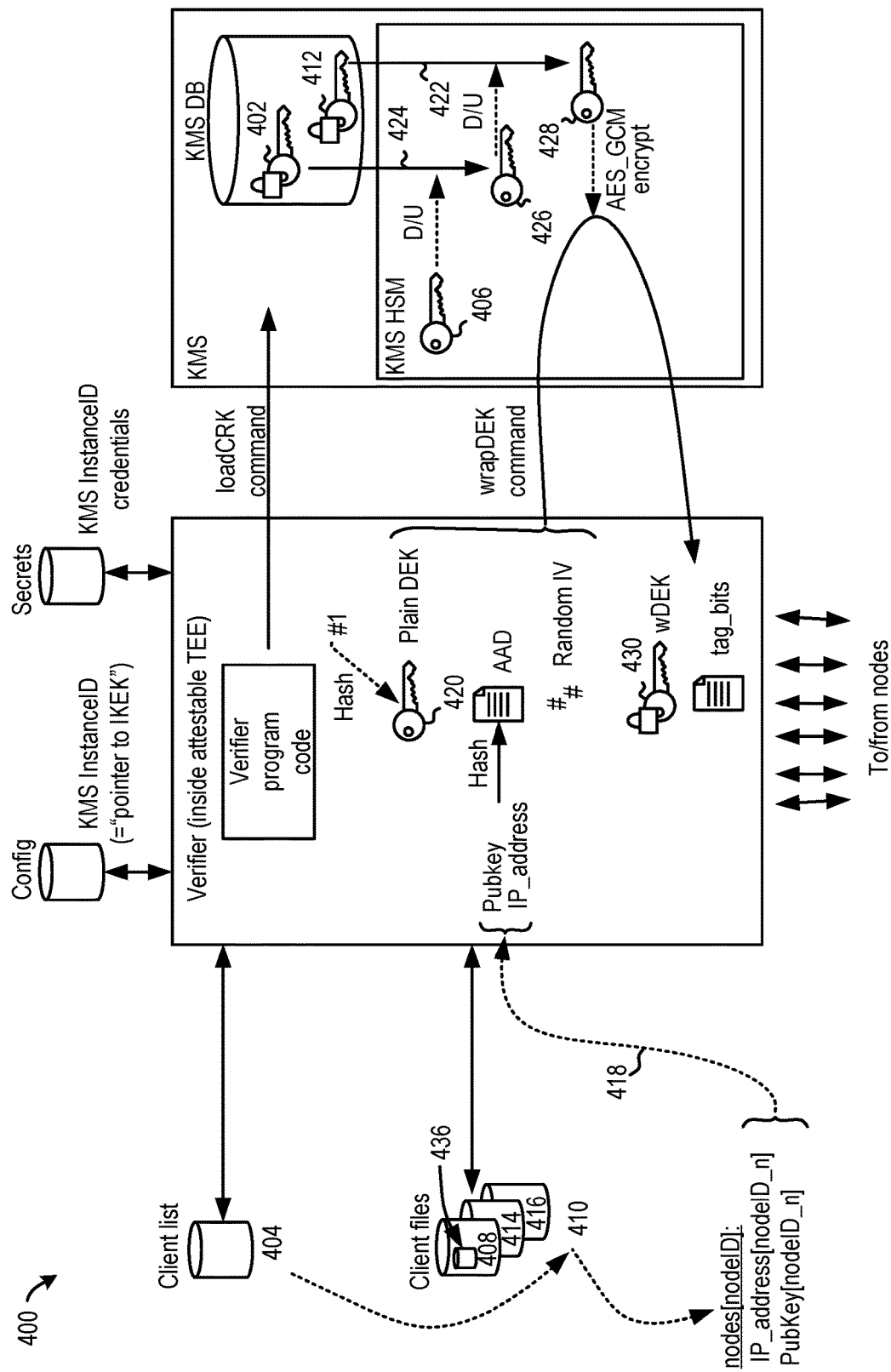

Referring now to FIG. 4F, the loading of the CRK 412 to the KMS HSM may be performed in accordance with a wrapDEK command. More specifically, in a first step, the IKEK 402 is loaded from the KMS DB to the KMS HSM via an unwrapping, e.g., via decryption, the IKEK 402 using the MKEK 406. In a next step, the CRK 412 is loaded to the KMS HSM and unwrapped and/or decrypted using the unwrapped IKEK 426. Thereafter the decrypted CRK 428 is used to encrypt the plain DEK 420 by considering the AAD and the random IV, thereby establishing a wrapped DEK, e.g., see wDEK 430, which is essentially the plain DEK that has been AES with Galois/Counter Mode (AES-GCM) encrypted using the decrypted CRK 428 while considering the AAD and the random IV to do so. Plain bits of the plain DEK are also available. Furthermore, because AAD is present in the verifier, tag_bits are also created with the wDEK during the AES-GCM encryption, which as will be described in greater detail elsewhere herein, may be used to double check encryption operations.

In some illustrative approaches the process of registration of the node may include the client device registering a node using an associated clientID. For example, the verifier may receive the public key from the node TPM, e.g., pub_key, node_id, and the verifier obtains the IP_address of the node, e.g., see IP_address. In one of such approaches, the verifier may perform a SHA256, or another similar known type of hash function, with the PubKey and/or the IP_address, e.g., authenticity_hash. In one optional approach, the verifier knows the one and only final hash. In such an approach in the event that the final hash is not known, the verifier may use a random number, e.g., hash_final, hash_final_known_bool. Moreover, the verifier may execute a wrapDEK operation in a KMS instance with plainDEK=hash_final, AAD=authenticity_hash, using the CRK_keyID for the wrapping, e.g., wrappedDEK, tag_bits. Thereafter the verifier stores the key information, e.g., node_id, value:[pub_key, IP_address, wrappedDEK, tag_bits] in the node_list[clientID].

In some approaches, the client is linked to both the verifier and the HSM via the CRK (the CRK is stored by KMS in wrapped form, to "load" equates to unwrapping the CRK into the HSM. The IKEK may be required inside the HSM to allow the unwrapping, which links the CRK to the IKEK and with that to the verifier.

Figure 4G:
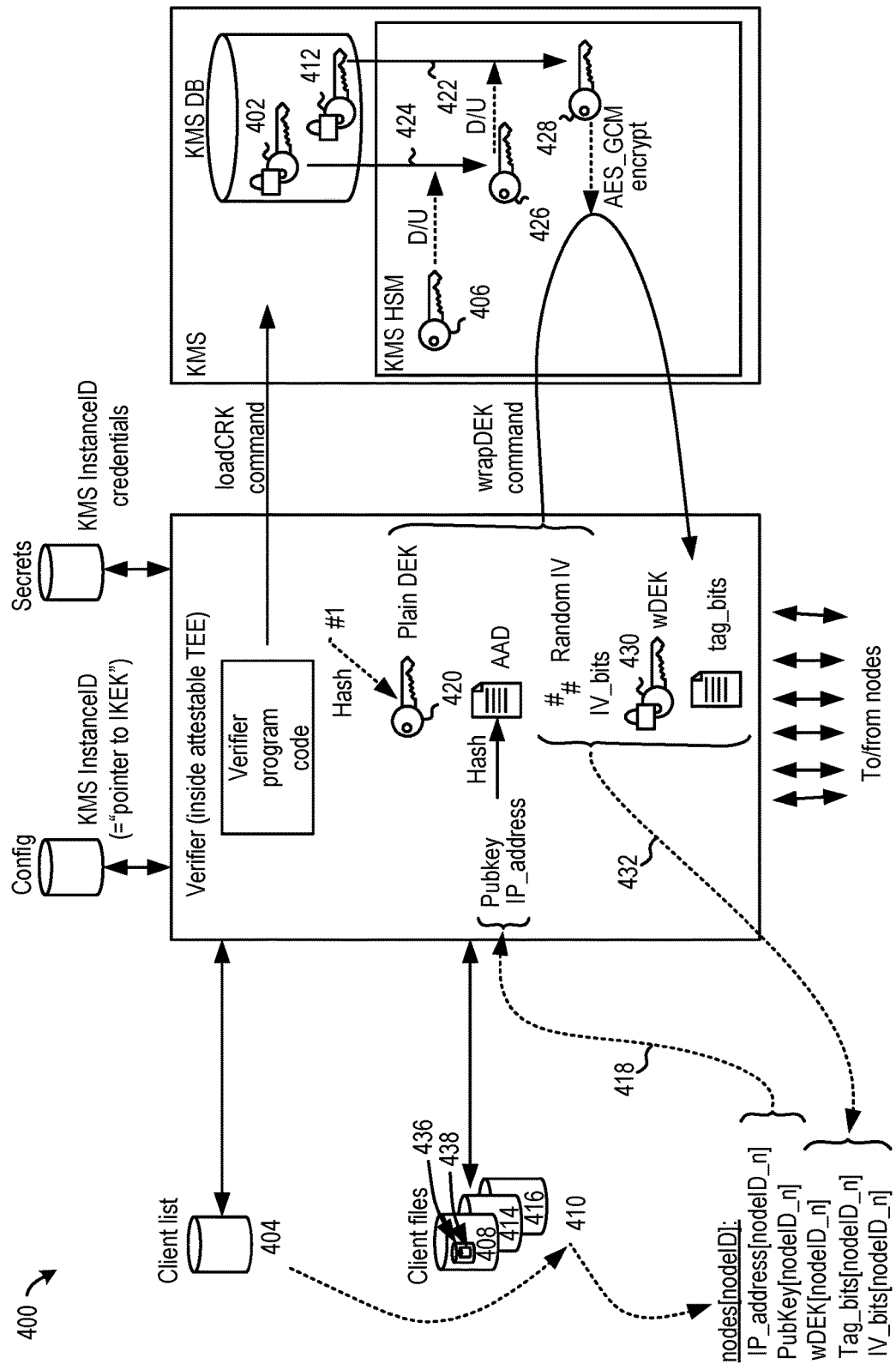

In operation 432 of FIG. 4G, IV_bits resulting from the encryption, the wDEK 430 and the tag_bits are stored as information related to a specific node, e.g., see nodes [nodeID]. Such information is in some approaches preferably stored in a database managed by the verifier. In some other approaches the information may be output to and stored on a client device.

Figure 4H:
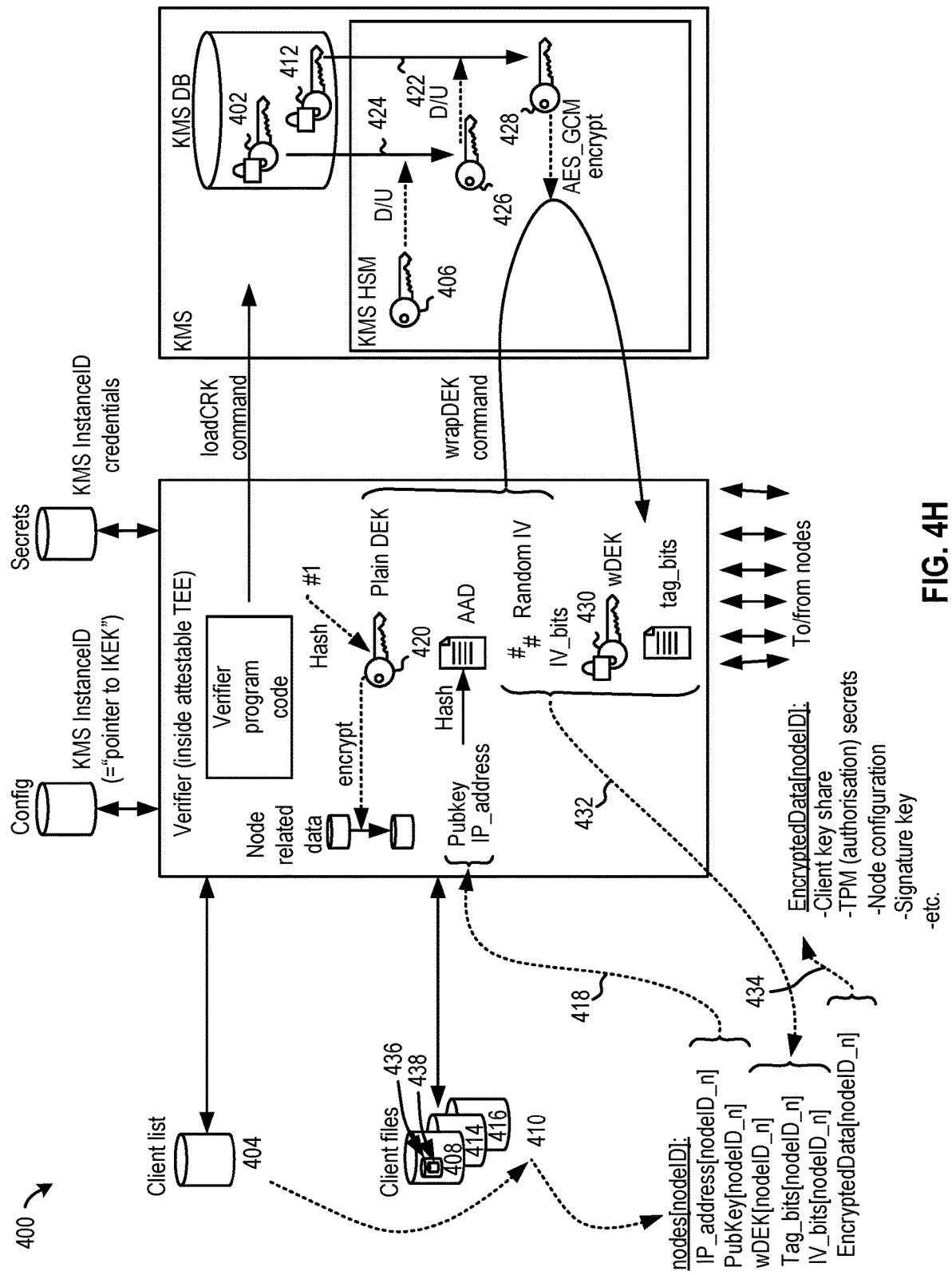

Referring now to FIG. 4H, in operation 434, secret data may be received in the network 400 from a client device. For example, such secret data may include, e.g., a client key share, predetermined trusted platform module (TPM) (authorisation) secrets, what the node configuration is, what the signature key is, etc. For example, such information may be Node related data that is loaded to the verifier, encrypted using the plain DEK 420, and securely stored inside of a relevant client file, e.g., see Client files. Such secret information may be used in order for client devices to access trusted platform modules on a certain node. This is useful because as a client device attempts to access a certain node, it is ensured that access information related to that node is authenticated securely such that the client cannot be fooled into attempting to access a nefarious node, e.g., another node that is pretended to be a node that is actually operating.

In some approaches, the node via the TPM public key (~=certificate) and IP address are authenticated by the HSM. This may be somewhat complicated immediately understand, although one of ordinary skill in the art will fully understand the process upon reading the descriptions herein. For example, and as will be described in greater detail elsewhere below, where the SHA256 of the public key and/or IP address is used as an AAD of AES-GCM encryption, a consecutive decryption attempt only succeeds in some approaches if and only if the same SHA256 value is used as AAD that was used during the encryption.

At this point, the verifier service is up and running, several clients are registered where each of such clients may have one or several compute nodes, and for each of these client compute nodes there is some securely encrypted information. Various operations of network 400 may be used in FIGS. 5A-5F to verify a node in accordance with one embodiment.

FIGS. 5A-5F depict the network 400 of FIGS. 4A-4H, in accordance with one embodiment. Specifically, in FIGS. 5A-5F various operations are performed to verify a node registered with the network 400 in FIGS. 4A-4H. As an option, the present network 400 may be implemented in conjunction with features from any other embodiment listed herein, such as those described with reference to the other FIGS. Of course, however, such network 400 and others presented herein may be used in various applications and/or in permutations which may or may not be specifically described in the illustrative embodiments listed herein. Further, the network 400 presented herein may be used in any desired environment.

Figure 5A:
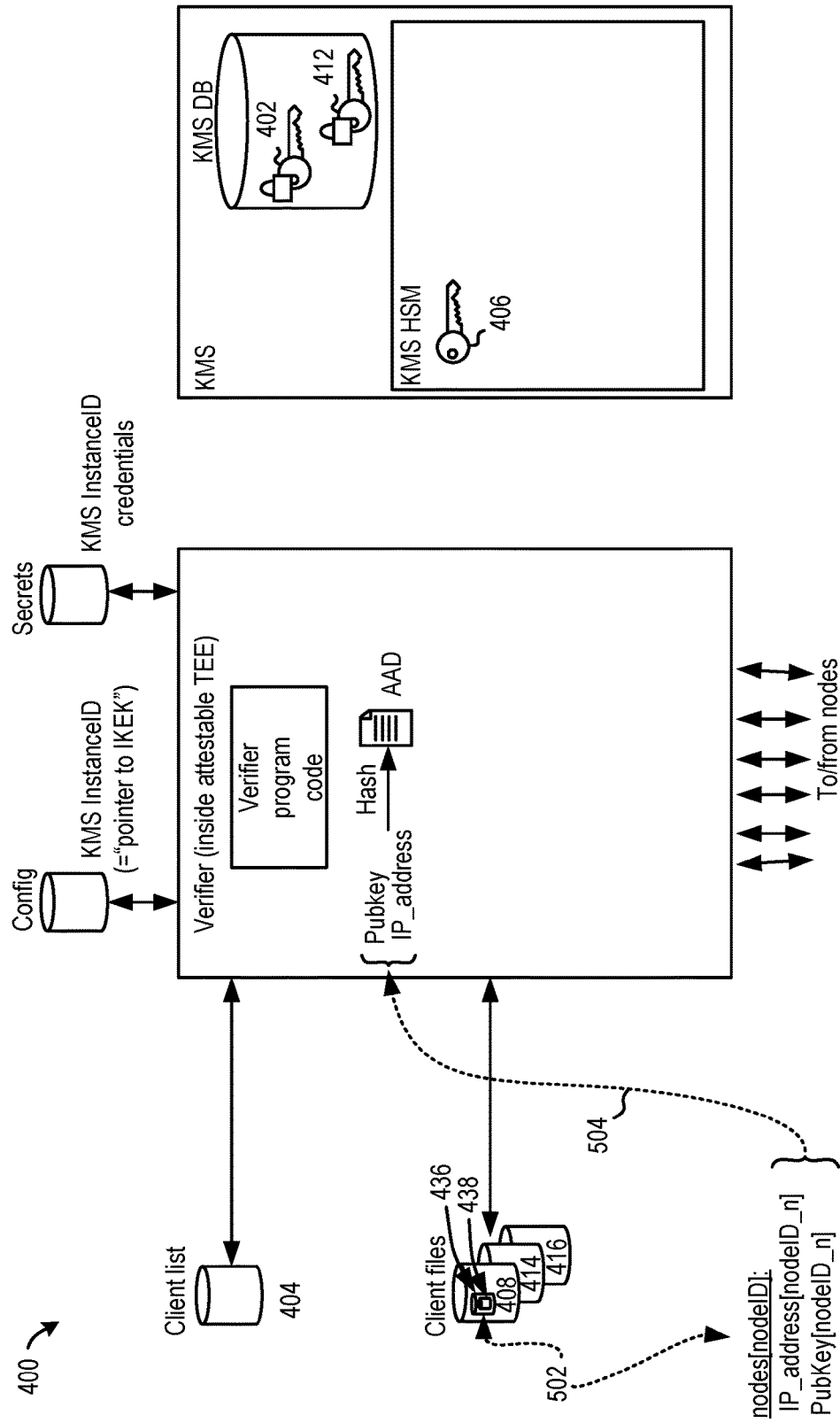
FIGS. 5A-5F depict verification of the node registered in the network of FIGS. 4A-4H, in accordance with one embodiment.

With reference now to FIG. 5A, it may be assumed that the verifier is up and running, client files and clients are registered in the network 400. Node data, e.g., nodes[nodeID_n] of node 502 may include any predetermined identifying information of a node, e.g., an IP address of the node, a public key of the node, any one or more types of information used in registration of the node with the verifier, etc. In operation 504 node information of the node is loaded into the verifier. Because the node is in fact a registered node as opposed to a nefarious node, a hash of the information, e.g., see Hash, returns AAD that matches the AAD of a client associated with the node. Accordingly, the AAD is regenerated on the fly.

Figure 5B:
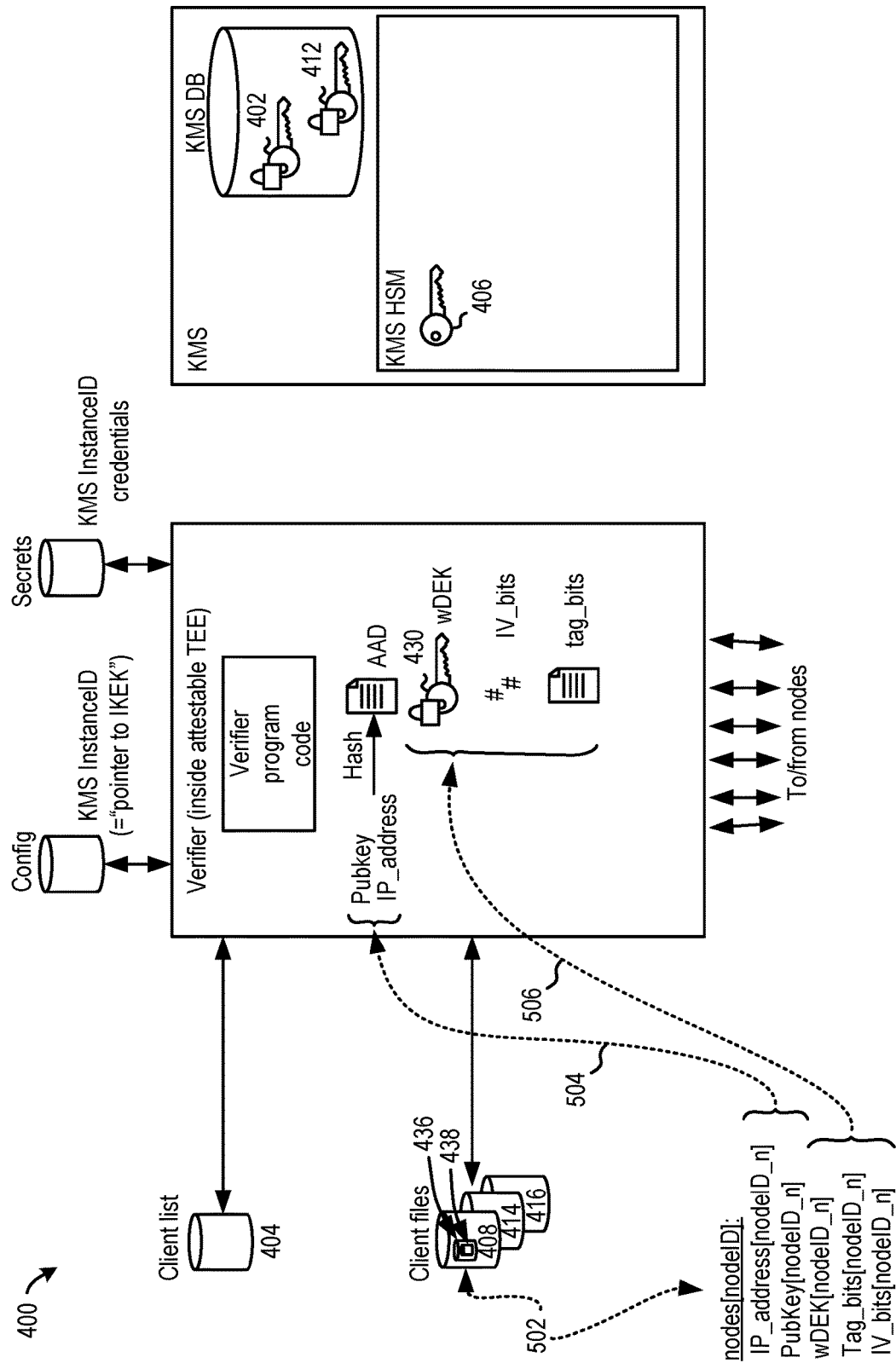

Referring now to FIG. 5B, in operation 506 the encrypted DEK, the IV bits and the tag bits generated in registration operations described in FIGS. 4A-4H are reloaded on the verifier.

Figure 5C:
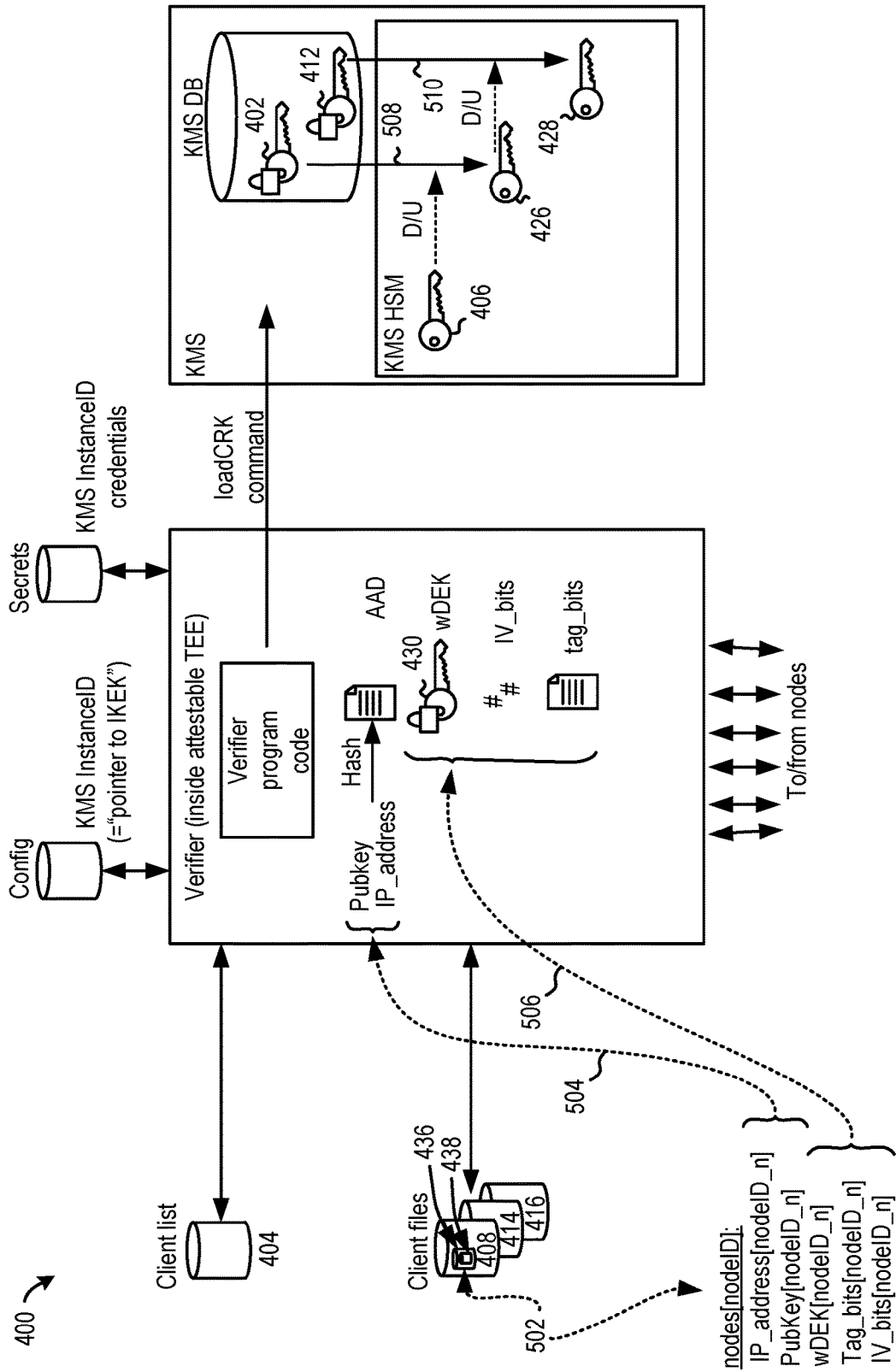

In FIG. 5C, a command is issued by the verifier to the KMS to load the CRK 412 to the KMS HSM, e.g., see loadCRK command. In operation 508 and operation 510, the encrypted IKEK 402 and the encrypted CRK 412 are decrypted and reloaded on the KMS HSM. The techniques used for loading and decrypting the encrypted IKEK 402 and the encrypted CRK 412 on the KMS HSM, e.g., see operation 424 and operating 422, may be utilized for reloading the decrypting the encrypted IKEK 402 and the encrypted CRK 412 on the KMS HSM, e.g., see operation 508 and operation 510.

Figure 5D:
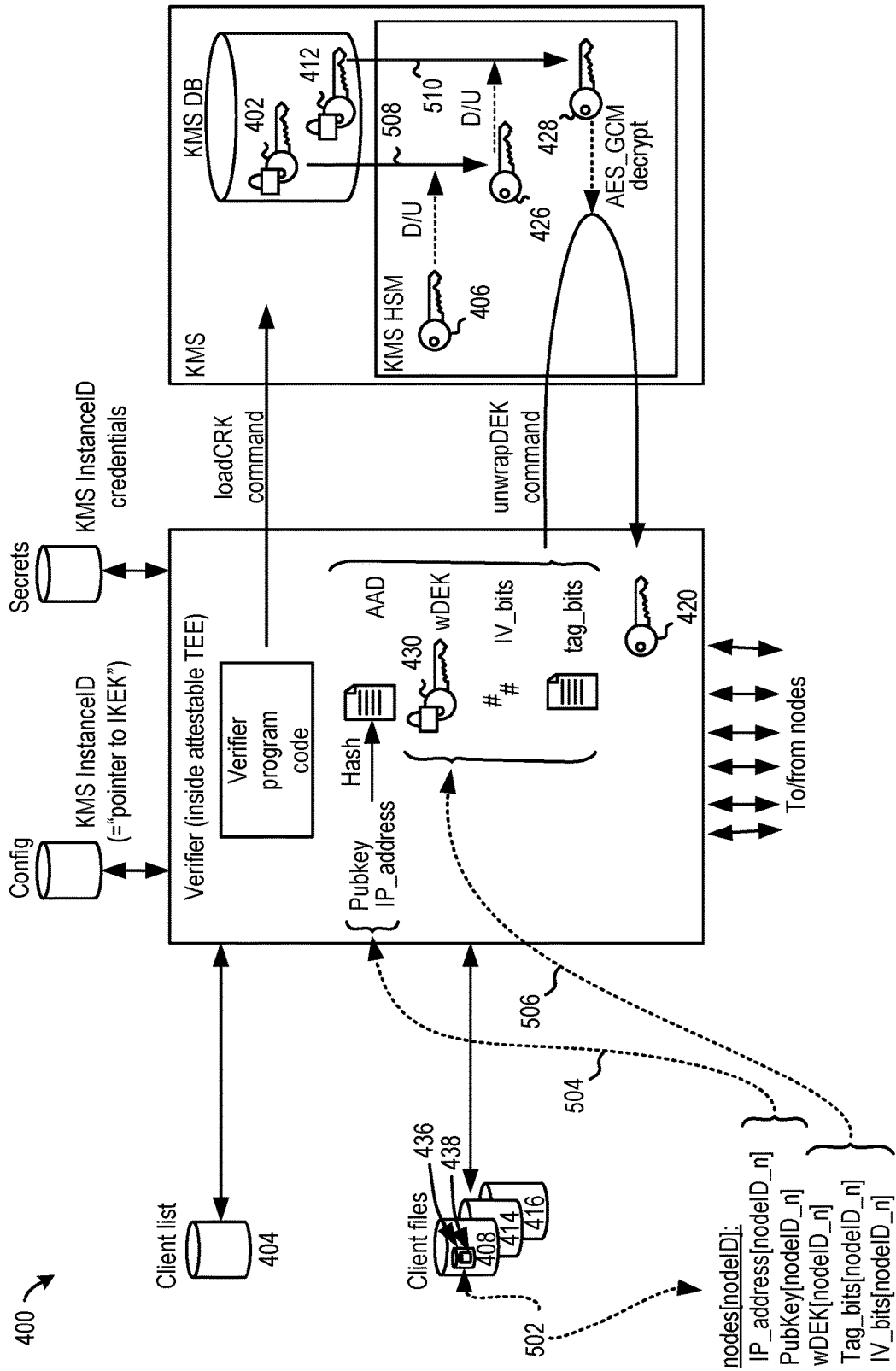

Referring now to FIG. 5D, subsequent to the reloading the decrypting of the encrypted IKEK 402 and the encrypted CRK 412 on the KMS HSM, a command to decrypt the wDEK 430 is issued, e.g., via unwrapDEK command. The plain DEK results from performing the unwrapDEK command on the wDEK 430.

In preferred approaches, a determination is made that this operation succeeds if the tag bits of the node 502 match, e.g., are the very same, with the tag bits that were generated during registration of the node, e.g., the tag bits resulting from performance of the wrapDEK command in FIG. 4F. Note that without possession and/or knowledge of the information used to previously wrap the plain DEK during registration of the node, the wDEK 430 will not be able to be unwrapped in accordance with the unwrapDEK command in FIG. 5D. Accordingly, it may be determined that the operation succeeds if the tag bits of the node 502 match with the tag bits that were generated during registration of the node. In contrast, it may be determined that the operation did not succeed if the tag bits of the node 502 do not match with the tag bits that were generated during registration of the node.

Figure 5E:
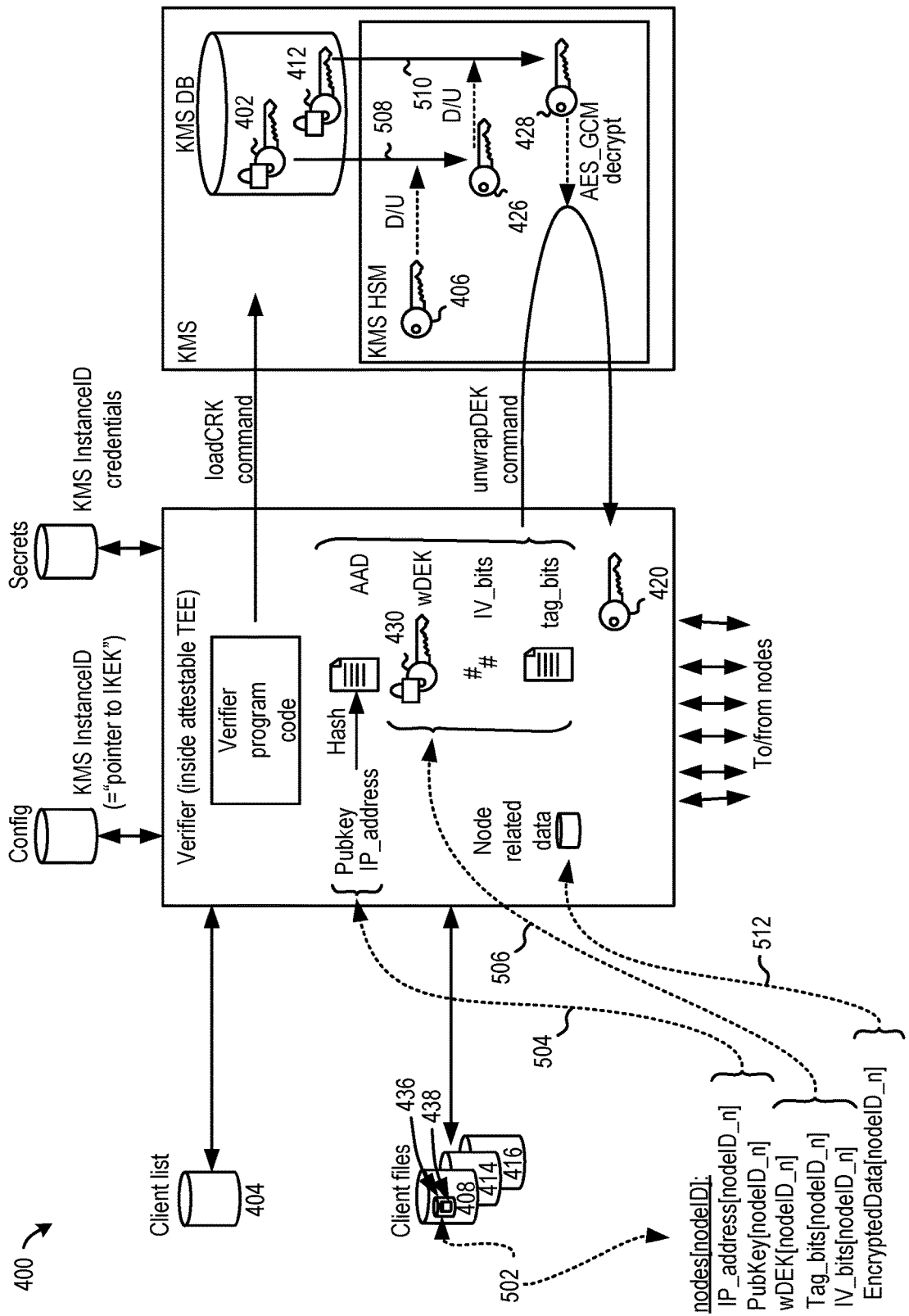
Figure 5F:
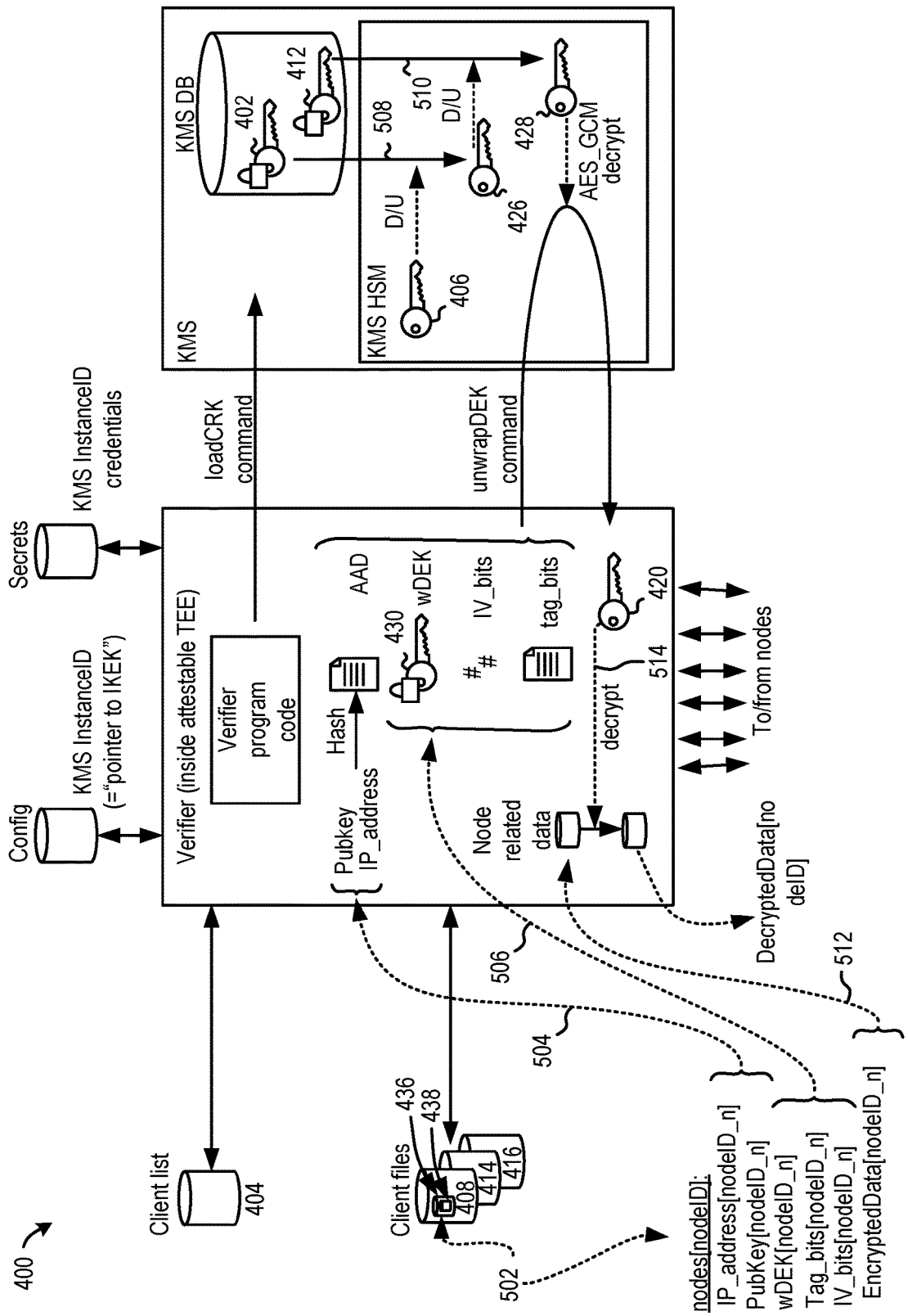

With reference now to FIG. 5E, assuming that it is determined that the bits do match, it may be determined that access has been regained to the plain bits of the data encryption key, e.g., bits of the plain DEK 420. This means that previously encrypted node related data may be loaded and decrypted using the bits of the plain DEK 420. For example, with reference now to FIG. 5E, node related data that was previously encrypted using bits of the plain DEK, e.g., see EncryptedData[nodeID_n], is loaded onto the verifier in operation 512. Referring now to FIG. 5F, the node related data is decrypted using the bits of the plain DEK 420 in operation 514, e.g., see resulting DecryptedData[nodeID]. At this point, it may be determined that the PubKey for the node 502 having the specified IP address, e.g., see PubKey and IP_address, is authentic, and has all the secret information that is called for to access nodes. For example, such information may include TPM (authorisation) secrets for the node 502. As mentioned earlier, it may be determined that this information is authentic because the wDEK is successfully decrypted. Accordingly, actual verification work for the nodes may be performed. For example, in some approaches one or more known types of node verifying operations may be performed.

In one illustrative approach, the verifier may be used to perform the verification of the nodes. For example, for all clientIDs the verifier may retrieve the node_list[clientID], CRK_keyID[clientID] from the client_list. For all entries in node_list[clientID] a process may be performed that includes the verifier retrieving a signed hash from node TPM, e.g., proposed_hash, hash_signature. The process may additionally and/or alternatively include the verifier retrieving the [pub_key, IP_address, wrapedDEK, tag_bits] for the node_id from the key-value store. The verifier may perform a SHA256 hash, or another similar known type of hash with the [PubKey||IP_address] for the recreated_authenticity_hash. Furthermore, the verifier may perform a predetermined unwrapDEK operation in the KMS instance with wrapedDEK, tag_bits, AAD=recreated_authenticity_hash using the CRK_keyID for the wrapping, e.g., plainDEK or failure. In response to a determination that a failure has occurred, the information does not match, an alarm may be raised because the AES-GCM tag bit verification failed. In response to a determination that a failure has not occurred the pub key may be used to check hash_signature. In response to a determination that the hash_final_known_bool==true, the verifier is instructed to check that the proposed_hash==plainDEK. Outcomes of this check include a success, e.g., OK, or failure. In response to a determination that the outcome is a failure, an alarm is raised because the hashes do not match. In response to a determination that the outcome is not a failure, the verification is complete. Note that the verifier does not need to always go to the HSM, and in contrast may keep some results in TEE memory for performance.

In another illustrative approach, where a TPM hash, or a SHA256 of it just to make it a valid AES256 key, is used as the plain bits of a DEK, even this TPM hash may be authenticated and verified by the HSM. In some approaches, an AES-GCM encryption SHA256 (TPM hash) may be used inside the KMS HSM, a CRK may be used as a key, and a SHA256 of the public key and/or the IP address as the AAD. During the encryption, the HSM may generate tag bits. These tag bits which "bind" everything together, e.g., where the everything include the IP address, public key, client, verifier[TPM hash], KMS HSM), etc. In the event that it is determined that even one bit changes in any of these types of information, the decryption attempt fails and reveals that something is wrong.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   using a first symmetric key to encrypt a second symmetric key,
     wherein the first symmetric key is securely loaded inside a hardware security module (HSM) by a key management service before the encryption of the second symmetric key,
     wherein a cloud provider only has access to encrypted bits of the first symmetric key;
     wherein key data of a key-value-pair of the second symmetric key is used as additional authenticated data (AAD) for the encryption of the second symmetric key;
   using the second symmetric key to encrypt value data of the key-value-pair; and
   storing the encrypted second symmetric key, the AAD used in the encryption of the second symmetric key, and tag bits created during the encryption of the second symmetric key, to thereafter use for verifying node related data.

2. The computer-implemented method of claim 1, comprising:
   receiving the node related data of a node, wherein the node related data includes tag bits of the node and an AAD of the node;
   using the first symmetric key to decrypt an encrypted third symmetric key associated with the node related data; and
   determining an authenticity of the decrypted third symmetric key, wherein the authenticity of the decrypted third symmetric key is determined based on a first comparison of the tag bits of the node with the tag bits created during the encryption of the second symmetric key, and based on a second comparison of the AAD of the node with the AAD used in the encryption of the second symmetric key.

3. The computer-implemented method of claim 2, wherein the decrypted third symmetric key is determined to be authentic in response to a determination that the AAD of the node matches with the AAD used in the encryption of the second symmetric key in the first comparison, and a determination that the tag bits of the node match with the tag bits created during the encryption of the second symmetric key in the second comparison.

4. The computer-implemented method of claim 3, comprising:
   in response to the determination that the decrypted third symmetric key is authentic, using the decrypted third symmetric key to decrypt the encrypted value data of the key-value-pair; and
   performing a verification operation on the received node related data.

5. The computer-implemented method of claim 3, wherein the third symmetric key is the second symmetric key.

6. The computer-implemented method of claim 3, wherein the decrypted third symmetric key is determined to be not authentic in response to a determination that the AAD of the node do not match with the AAD used in the encryption of the second symmetric key in the first comparison and/or a determination that the tag bits of the node do not match with the tag bits created during the encryption of the second symmetric key in the second comparison, and comprising: in response to a determination that the decrypted third symmetric key is not authentic, not using the decrypted third symmetric key to decrypt the encrypted value data of the key-value-pair; and outputting a warning that the received node related data failed authentication.

7. The computer-implemented method of claim 1, wherein securely loading the first symmetric key inside the HSM by the key management service before the encryption of the second symmetric key includes:
   loading an encrypted instance key encryption key (IKEK) of a database to the HSM,
   using a master key encryption key (MKEK) of the HSM to decrypt the encrypted IKEK in the HSM,
   loading the first symmetric key to the HSM from the database, wherein the first symmetric key is encrypted in the database, and
   using the decrypted IKEK to decrypt the encrypted first symmetric key.

8. The computer-implemented method of claim 1, wherein
   Advanced Encryption Standard with Galois/Counter Mode (AES-GCM) encryption is used to encrypt the second symmetric key.

9. The computer-implemented method of claim 1, comprising:
   executing a verifier of an attestable trusted execution environment (TEE) to verify the node related data in a cloud computing environment inside the TEE.

10. The computer-implemented method of claim 1, wherein the encryption of the second symmetric key is an authenticated encryption with associated data (AEAD), wherein the key data of the key-value-pair of the second symmetric key is used as the AAD for the AEAD encryption of the second symmetric key.

11. A computer program product, the computer program product comprising a computer readable storage medium having program instructions embodied therewith, the program instructions readable and/or executable by a computer to cause the computer to:
   use, by the computer, a first symmetric key to encrypt a second symmetric key,
     wherein the first symmetric key is securely loaded inside a hardware security module (HSM) by a key management service before the encryption of the second symmetric key, wherein a cloud provider only has access to encrypted bits of the first symmetric key;

wherein key data of a key-value-pair of the second symmetric key is used as additional authenticated data (AAD) for the encryption of the second symmetric key;

use, by the computer, the second symmetric key to encrypt value data of the key-value-pair; and store, by the computer, the encrypted second symmetric key, the AAD used in the encryption of the second symmetric key, and tag bits created during the encryption of the second symmetric key, to thereafter use for verifying node related data.

12. The computer program product of claim 11, the program instructions readable and/or executable by the computer to cause the computer to:

receive, by the computer, the node related data of a node, wherein the node related data includes tag bits of the node and an AAD of the node;

use, by the computer, the first symmetric key to decrypt an encrypted third symmetric key associated with the node related data; and determine, by the computer, an authenticity of the decrypted third symmetric key, wherein the authenticity of the decrypted third symmetric key is determined based on a first comparison of the tag bits of the node with the tag bits created during the encryption of the second symmetric key, and based on a second comparison of the AAD of the node with the AAD used in the encryption of the second symmetric key.

13. The computer program product of claim 12, wherein the decrypted third symmetric key is determined to be authentic in response to a determination that the AAD of the node matches with the AAD used in the encryption of the second symmetric key in the first comparison, and a determination that the tag bits of the node match with the tag bits created during the encryption of the second symmetric key in the second comparison.

14. The computer program product of claim 13, the program instructions readable and/or executable by the computer to cause the computer to:

in response to the determination that the decrypted third symmetric key is authentic, use, by the computer, the decrypted third symmetric key to decrypt the encrypted value data of the key-value-pair; and perform, by the computer, a verification operation on the received node related data.

15. The computer program product of claim 13, wherein the third symmetric key is the second symmetric key.

16. The computer program product of claim 13, wherein the decrypted third symmetric key is determined to be not authentic in response to a determination that the AAD of the node do not match with the AAD used in the encryption of the second symmetric key in the first comparison and/or a determination that the tag bits of the node do not match with the tag bits created during the encryption of the second symmetric key in the second comparison, and the program instructions readable and/or executable by the computer to cause the computer to: in response to a determination that the decrypted third symmetric key is not authentic, not use, by the computer, the decrypted third symmetric key to decrypt the encrypted value data of the key-value-pair; and output, by the computer, a warning that the received node related data failed authentication.

17. The computer program product of claim 11, wherein securely loading the first symmetric key inside the HSM by the key management service before the encryption of the second symmetric key includes:

loading an encrypted instance key encryption key (IKEK) of a database to the HSM, using a master key encryption key (MKEK) of the HSM to decrypt the encrypted IKEK in the HSM, loading the first symmetric key to the HSM from the database, wherein the first symmetric key is encrypted in the database, and using the decrypted IKEK to decrypt the encrypted first symmetric key.

18. The computer program product of claim 11, wherein Advanced Encryption Standard with Galois/Counter Mode (AES-GCM) encryption is used to encrypt the second symmetric key.

19. The computer program product of claim 11, the program instructions readable and/or executable by the computer to cause the computer to: execute, by the computer, a verifier of an attestable Trusted Execution Environment (TEE) to verify the node related data in a cloud computing environment inside the TEE.

20. A system, comprising:

a hardware processor; and logic integrated with the hardware processor, executable by the hardware processor, or integrated with and executable by the hardware processor, the logic being configured to:

use a first symmetric key to encrypt a second symmetric key, wherein the first symmetric key is securely loaded inside a hardware security module (HSM) by a key management service before the encryption of the second symmetric key, wherein securely loading the first symmetric key inside the HSM by the key management service before the encryption of the second symmetric key includes:

loading an encrypted instance key encryption key (IKEK) of a database to the HSM;

using a master key encryption key (MKEK) of the HSM to decrypt the encrypted IKEK in the HSM;

loading the first symmetric key to the HSM from the database, wherein the first symmetric key is encrypted in the database; and using the decrypted IKEK to decrypt the encrypted first symmetric key, wherein a cloud provider only has access to encrypted bits of the first symmetric key;

wherein key data of a key-value-pair of the second symmetric key is used as additional authenticated data (AAD) for the encryption of the second symmetric key;

use the second symmetric key to encrypt value data of the key-value-pair; and store the encrypted second symmetric key, the AAD used in the encryption of the second symmetric key, and tag bits created during the encryption of the second symmetric key, to thereafter use for verifying node related data.

* * * * *